US009317835B2

(12) United States Patent  
Calman et al.

(10) Patent No.: US 9,317,835 B2
(45) Date of Patent: Apr. 19, 2016

(54) POPULATING BUDGETS AND/OR WISH LISTS USING REAL-TIME VIDEO IMAGE ANALYSIS

(75) Inventors: Matthew A. Calman, Charlotte, NC (US); Erik Stephen Ross, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 923 days.

(21) Appl. No.: 13/365,996

(22) Filed: Feb. 3, 2012

(65) Prior Publication Data

US 2012/0233015 A1    Sep. 13, 2012

Related U.S. Application Data

(60) Provisional application No. 61/450,213, filed on Mar. 8, 2011.

(51) Int. Cl.
| | |
|---|---|
| *G06Q 30/06* | (2012.01) |
| *G06Q 40/00* | (2012.01) |
| *G06Q 10/10* | (2012.01) |
| *G06Q 30/02* | (2012.01) |
| *G06Q 40/02* | (2012.01) |

(52) U.S. Cl.
CPC .............. *G06Q 10/10* (2013.01); *G06Q 30/02* (2013.01); *G06Q 30/06* (2013.01); *G06Q 30/0633* (2013.01); *G06Q 40/02* (2013.01)

(58) Field of Classification Search
CPC .................................................... G06Q 30/06
USPC ............................................. 705/26.1–27.2
See application file for complete search history.

(56) References Cited

U.S. PATENT DOCUMENTS

| | | | |
|---|---|---|---|
| 5,768,633 | A | 6/1998 | Allen et al. |
| 6,202,055 | B1 | 3/2001 | Houvener et al. |

(Continued)

FOREIGN PATENT DOCUMENTS

| | | |
|---|---|---|
| JP | 2007-266143 | 10/2007 |
| KR | 1020090047614 A | 5/2009 |
| KR | 1020090105734 A | 10/2009 |

OTHER PUBLICATIONS

Brody, A B (1999), Pocket BargainFinder: A Handheld Device for Augmented Commerce. Handheld and Ubiquitous Computing, First International Symposium, HUC'99 Karlsruhe, Germany, Sep. 27-29, 1999 Proceedings, pp. 44-51. Retrieved from https://search.proquest.com/professional/docview/729929360/briefcitation/1510901369B4C70B903/3?accountid=142257.*

(Continued)

*Primary Examiner* — Jeffrey A Smith
*Assistant Examiner* — Jennifer Lee
(74) *Attorney, Agent, or Firm* — Michael A. Springs; Moore & Van Allen PLLC; Nicholas C. Russell

(57) ABSTRACT

System, method, and computer program product are provided for using real-time video analysis, such as augmented reality to provide the user of a mobile device with real-time budgeting and wish lists. Through the use of real-time vision object recognition objects, logos, artwork, products, locations, and other features that can be recognized in the real-time video stream can be matched to data associated with such to provide the user with real-time budget impact and wish list updates based on the products and budget data determined as being the object. In this way, the objects, which may be products and/or budget data in the real-time video stream, may be included into a user's budget and/or wish list, such that the user receives real-time budget and/or wish list updates incorporating product and/or budget data located in a real-time video stream.

15 Claims, 8 Drawing Sheets

(56) References Cited

U.S. PATENT DOCUMENTS

| | | | |
|---|---|---|---|
| 6,522,772 B1 | 2/2003 | Morrison et al. |
| 6,533,392 B1 | 3/2003 | Koitbashi |
| 6,636,249 B1 | 10/2003 | Rekimoto |
| 6,674,993 B1 | 1/2004 | Tarbouriech |
| 6,856,965 B1 | 2/2005 | Stinson et al. |
| 7,016,532 B2 | 3/2006 | Boncyk et al. |
| 7,062,454 B1 | 6/2006 | Giannini et al. |
| 7,110,964 B2 | 9/2006 | Tengler et al. |
| 7,154,529 B2 | 12/2006 | Hoke et al. |
| 7,155,228 B2 | 12/2006 | Rappaport et al. |
| 7,309,015 B2 | 12/2007 | Frantz et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,526,280 B2 | 4/2009 | Jung et al. |
| 7,564,469 B2 | 7/2009 | Cohen |
| 7,565,008 B2 | 7/2009 | Boncyk et al. |
| 7,615,446 B2 | 11/2009 | Kim et al. |
| 7,634,448 B1 | 12/2009 | Ramachandran |
| 7,680,324 B2 | 3/2010 | Boncyk et al. |
| 7,693,585 B2 | 4/2010 | Kalan et al. |
| 7,735,728 B2 | 6/2010 | Wallerstorfer |
| 7,775,437 B2 | 8/2010 | Cohen |
| 7,792,738 B2 | 9/2010 | Channell |
| 7,840,031 B2 | 11/2010 | Albertson et al. |
| 7,881,243 B2 | 2/2011 | Hardy et al. |
| 7,881,529 B2 | 2/2011 | Boncyk et al. |
| 7,899,243 B2 | 3/2011 | Boncyk et al. |
| 7,899,252 B2 | 3/2011 | Boncyk et al. |
| 7,962,128 B2 | 6/2011 | Neven et al. |
| 7,970,649 B2 | 6/2011 | Wu |
| 7,983,971 B1 | 7/2011 | McLuckie et al. |
| 7,988,060 B2 | 8/2011 | Killian et al. |
| 8,121,944 B2 | 2/2012 | Norman et al. |
| 8,138,930 B1 | 3/2012 | Heath |
| 8,145,594 B2 | 3/2012 | Geisner et al. |
| 8,154,428 B2 | 4/2012 | Do et al. |
| 8,180,377 B2 | 5/2012 | Yang et al. |
| 8,233,673 B2 | 7/2012 | Britz et al. |
| 8,301,501 B1* | 10/2012 | Glaeser et al. ............... 705/17 |
| 8,385,971 B2 | 2/2013 | Rhoads et al. |
| 8,392,450 B2 | 3/2013 | Blanchflower et al. |
| 8,438,091 B1* | 5/2013 | Berman .................. 705/36 R |
| 8,438,110 B2 | 5/2013 | Calman et al. |
| 8,571,888 B2 | 10/2013 | Calman et al. |
| 8,843,405 B1* | 9/2014 | Hartman et al. ............. 705/30 |
| 2002/0091607 A1* | 7/2002 | Sloan et al. .................. 705/36 |
| 2002/0124188 A1 | 9/2002 | Sherman et al. |
| 2003/0064705 A1 | 4/2003 | Desiderio |
| 2004/0021584 A1 | 2/2004 | Hartz, Jr. et al. |
| 2004/0024709 A1 | 2/2004 | Yu et al. |
| 2005/0162523 A1 | 7/2005 | Darrell et al. |
| 2006/0002607 A1* | 1/2006 | Boncyk et al. .............. 382/165 |
| 2006/0100951 A1 | 5/2006 | Mylet et al. |
| 2006/0253329 A1* | 11/2006 | Haines ............... B01J 23/6562 705/14.4 |
| 2007/0088746 A1* | 4/2007 | Baker ....................... 707/104.1 |
| 2007/0140595 A1 | 6/2007 | Taylor et al. |
| 2007/0162942 A1* | 7/2007 | Hamynen et al. ............ 725/105 |
| 2007/0162971 A1 | 7/2007 | Blom et al. |
| 2007/0279521 A1 | 12/2007 | Cohen |
| 2008/0040278 A1 | 2/2008 | DeWitt |
| 2008/0070198 A1 | 3/2008 | Dempsey |
| 2008/0214210 A1 | 9/2008 | Rasanen et al. |
| 2008/0243721 A1 | 10/2008 | Joao |
| 2008/0267447 A1 | 10/2008 | Kelusky et al. |
| 2008/0268876 A1 | 10/2008 | Gelfand et al. |
| 2009/0006191 A1 | 1/2009 | Arankalle et al. |
| 2009/0061949 A1 | 3/2009 | Chen |
| 2009/0089131 A1 | 4/2009 | Moukas et al. |
| 2009/0094125 A1 | 4/2009 | Killian et al. |
| 2009/0102859 A1 | 4/2009 | Athsani et al. |
| 2009/0112744 A1* | 4/2009 | Park et al. ...................... 705/34 |
| 2009/0121271 A1 | 5/2009 | Son et al. |
| 2009/0140839 A1 | 6/2009 | Bishop et al. |
| 2009/0144164 A1 | 6/2009 | Wane et al. |
| 2009/0171850 A1 | 7/2009 | Yuval |
| 2009/0182748 A1 | 7/2009 | Walker |
| 2009/0204511 A1 | 8/2009 | Tsang |
| 2009/0237546 A1 | 9/2009 | Bloebaum et al. |
| 2009/0250515 A1 | 10/2009 | Todd et al. |
| 2009/0251963 A1 | 10/2009 | Seol et al. |
| 2009/0254467 A1* | 10/2009 | Camp, Jr. ..................... 705/35 |
| 2009/0287587 A1* | 11/2009 | Bloebaum et al. ............ 705/27 |
| 2010/0002204 A1 | 1/2010 | Jung et al. |
| 2010/0130226 A1 | 5/2010 | Arrasvuori et al. |
| 2010/0185529 A1 | 7/2010 | Chesnut et al. |
| 2010/0228776 A1 | 9/2010 | Melkote et al. |
| 2010/0250581 A1 | 9/2010 | Chau |
| 2010/0255795 A1 | 10/2010 | Rubinsky et al. |
| 2010/0268629 A1* | 10/2010 | Ross et al. ..................... 705/35 |
| 2010/0277412 A1 | 11/2010 | Pryor |
| 2010/0281432 A1 | 11/2010 | Geisner et al. |
| 2010/0306712 A1 | 12/2010 | Snook et al. |
| 2010/0306715 A1 | 12/2010 | Geisner et al. |
| 2011/0022540 A1 | 1/2011 | Stern et al. |
| 2011/0034176 A1 | 2/2011 | Lord et al. |
| 2011/0077046 A1 | 3/2011 | Durand et al. |
| 2011/0079639 A1 | 4/2011 | Khan |
| 2011/0106622 A1 | 5/2011 | Kuhlman et al. |
| 2011/0119155 A1 | 5/2011 | Hammad et al. |
| 2011/0202460 A1 | 8/2011 | Buer et al. |
| 2011/0202466 A1 | 8/2011 | Carter |
| 2012/0013770 A1* | 1/2012 | Stafford et al. ............... 348/239 |
| 2012/0100915 A1 | 4/2012 | Margalit et al. |
| 2012/0330753 A1 | 12/2012 | Urbanski et al. |
| 2013/0011111 A1 | 1/2013 | Abraham et al. |

OTHER PUBLICATIONS

International Search Report and Written Opinion for International Application No. PCT/US12/27890 mailed Feb. 5, 2013.

PCT International Preliminary Report on Patentability (IPRP) for International Application No. PCT/US2012/048697 dated Feb. 4, 2014.

PCT International Search Report and Written Opinion for International Application NO. PCT/US 12/28008 dated May 22, 2012.

PCT International Search Report and Written Opinion for International Application No. PCT/US 12/28036 dated May 28, 2012.

PCT International Search Report and Written Opinion for International Application No. PCT/US2012/027912 dated Jun. 8, 2012.

PCT International Search Report and Written Opinion for International Application No. PCT/US 12/27892 dated Jun. 14, 2012.

M.J. Welch (2010). Addressing the Challenges in Underspecification in Web Search. (Order No. 3446833, University of California, Los Angeles). ProQuest Dissertations and Theses; 137; retrieved from http://search.proquest.com/docview/858101500?accountid=14753. (858101500).

K.J. Jeevan & P. Padhi (2006). A Selective Review of Research in Content Personalization. Library Review, 55(9), 556-586. doi:http://dx.doi.org/10.1108/00242530610706761.

P.A. Lessner (2007). Chi-thinking: Chiasmus and Cognition. (Order No. 3297307, University of Maryland, College Park). ProQuest Disserations and Theses; 487; retrieved from http://search.proquest.com/docview/304851937?accountid=14753. (304851937).

International Preliminary Examination Report for International Application No. PCT/US12/27892 dated Sep. 10, 2013; 9 pages.

International Preliminary Examination Report for International Application No. PCT/US2012/027890 dated Sep. 10, 2013; 6 pages.

International Preliminary Examination Report for International Application No. PCT/US12/28036 dated Sep. 10, 2013; 5 pages.

International Preliminary Examination Report for International Application No. PCT/US12/28008 dated Sep. 10, 2013; 7 pages.

International Preliminary Examination for International Application No. PCT/US12/27912 dated Sep. 10, 2013; 6 pages.

International Search Report and Written Opinion dated Oct. 12, 2012 for International Application No. PCT/US1248697.

* cited by examiner

WISH LIST INTERFACE 700

SECURITY 704

USER NAME 706　　　PASSWORD 708　　　SECURITY QUESTION 710

[CONTINUE]

INFORMATION ABOUT IMAGE TO ADD TO WISH LIST 736

IMAGE 742

CURRENT WISH LIST 740
- ☐ PRODUCT A
- ☐ PRODUCT B
- ☐ PRODUCT C

[REMOVE]

INFORMATION ABOUT PRODUCTS IN IMAGE 744

SELECT PRODUCT FOR WISH LIST 746

[ADD]

SHOW IMAGE OF PRODUCT ON WISH LIST 748

CURRENT INFORMATION ABOUT PRODUCTS ON WISH LIST 712

| MERCHANT LOCATION 714 | SALES 716 | ACCOMPANYING PRODUCTS 718 |
| PRICE 724 | PROMOTIONS 720 | ALTERNATIVE PRODUCTS 722 |

FINANCING PURCHASE OF PRODUCTS ON WISH LIST 726

| BUDGET 728 | PAYMENT ACCOUNT 730 | LOAN PROCUREMENT 732 |

[FINISHED 752]

Figure 7

POPULATING BUDGETS AND/OR WISH LISTS USING REAL-TIME VIDEO IMAGE ANALYSIS

CLAIM OF PRIORITY UNDER 35 U.S.C. §119

This Non-provisional patent application claims priority to U.S. Provisional Patent Application Ser. No. 61/450,213, filed Mar. 8, 2011, entitled "Real-Time Video Image Analysis Applications for Commerce Activity," assigned to the assignee hereof and hereby expressly incorporated by reference herein.

BACKGROUND

Even with advances in technology, budgeting finances to purchase various products is often difficult for a user. Purchasing large products, such as houses or cars, may affect a user's budget for many years. It is imperative that individual's budget correctly prior to a purchase, in order to have adequate financial stability for the purchase and after a purchase. However, budgeting can be challenging for several reasons. First, it is difficult to predict some future purchases that may be made. Second, budgeting takes planning, time, and sometime requires expert advice. Finally, after the budget is complete, it is easy for someone to stray from his/her budget and subsequently not be able to reach purchasing goals as early as desired.

Current handheld mobile devices, such as smart phones or the like, have the functionality to allow there use for a myriad of day to day transactions, such as paying for a cup of coffee or providing a boarding pass for a flight. These technological advances combine multiple technologies into a handheld mobile device to provide a user with a large number of capabilities. For example, many smart phones are equipped with significant processing power, sophisticated multi-tasking operating systems, and high-bandwidth Internet connection capabilities. Moreover, such devices often have additional features that are increasingly more common and standardized. Such features include, but are not limited to, location-determining devices, such as Global Positioning System (GPS) devices; sensor devices, such as accelerometers; and high-resolution video cameras.

As the hardware capabilities of such mobile devices have increased, so too have the applications (i.e., software) that rely on the hardware advances. One such example of innovative software is a category known as augmented reality ("AR"), or more generally referred to as mediated reality. The AR technology analyzes location data, compass direction data, and the like in combination with information related to the objects, locations or the like in the video stream to create browse-able "hot-spots" or "tags" that are superimposed on the mobile device display, resulting in an experience described as "reality browsing".

Therefore, a need exists to provide individuals with access to budgeting capabilities for easy budgeting and updating of a budget to include products the individual may wish to purchase in the future.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for using real-time video analysis, such as augmented reality ("AR") or the like to assist the user of mobile devices with populating budgets and/or wish lists, which allows a user to easily add products to budgets and/or wish lists and be able to begin planning to purchase the products in the future.

Using real-time video analysis, such as AR or the like the system may provide the user of mobile device real-time budget and/or wish list updates incorporating product and/or budget data located in a real-time video stream. In some embodiments, the budget may provide the user with real-time indication as to how purchasing a product may affect the user's budget, a future budget based on the purchasing of the product, etc. In some embodiments, wish list may provide the user with real-time indications as to the user's current wish list, current prices for products on the wish list, etc. Through the use of real-time vision object recognition, objects, logos, artwork, products, locations and other features that can be recognized in the real-time video stream can be matched to data associated with those objects, logos, artwork, products, locations, or other features to determine products and/or data for directories associated with budgeting and/or wish lists. In some embodiments, the user may not require using real-time video stream, but instead be able to take a still photo image of the product and/or budget data. In some embodiments, the data that is matched to the images is specific to financial institutions, such as user financial behavior history, user purchasing power, transaction history, and the like. In this regard, many of the embodiments herein disclosed leverage financial institution data, which is uniquely specific to financial institutions, in providing information to mobile device users in connection with real-time video stream analysis.

In some embodiments, the product and/or budget data is determined from the images in the real-time video stream. Products may include any good, service, etc. that a user may wish to purchase. For example, a user may provide real-time video images of a television that the user wishes to purchase. Budget data may include any product, document, statement, bill, financial record, etc. that the user may wish to incorporate into his/her budget. In this way, the user may be able to capture an image of a product and/or budget data and the product and/or budget data in that image may be provided to the user's wish list and/or the user's budget, such that the user has real-time wish list and budget data available. For example, if a user is wishing to purchase a vehicle, the user may take an image of the vehicle, the system may recognize the vehicle and provide data associated with the vehicle to the user's budged.

In this way, the user may be able to select an indicator associated with his/her budget and receive information about how purchasing the vehicle may effect his/her budget in the future, best payment mechanism to purchase the vehicle, how to receive a loan to purchase the vehicle, and/or if purchasing the vehicle is recommended based on the user's budgeting strategy. In other embodiments, the products and/or budget data that have been previously determined may be recognized with when images of the product and/or budget data are located within the real-time video stream. For example, if a user has previously put a specific television on his/her wish list. The user may use his/her real-time video stream to scan a planogram, down a street, a virtual store, etc. The system may then identify the television and the location within the planogram, merchant location on the street, and/or location in the virtual store, such that the user may be able to locate the products on his/her wish list using the system.

In some embodiments, the system may populate a budget and/or budget strategies. In some embodiments, the user may input, via an interface or the like information to set up a budget and/or budget strategy. In other embodiments, the system may automatically set up a user's budget and/or budget strategy. In yet other embodiments, a combination of user input and automatic system input may be utilized to set up a budget and/or budget strategy. A user budget provides a financial plan that forecasts revenues and expenditures, such that a model of financial performance may be obtained if certain strategies, evens, and/or plans are carried out. Budgets may include plans for saving, borrowing, and/or spending. The user may input information, such as expenses, retirement, goals, future purchases, income, etc. that all may be part of the user's budget. In some embodiments, the user may partially set up his/her budget. In this way, the user may select predetermined budgeting. For example, the user may indicate to the system that he/she wants to purchase a house in a year from now. The system may determine a budget for the user such that he/she may be able to provide the down payment on a house. In other embodiments, the budget and budget strategies may be set up automatically by the system. The budgets that may be set up via the system, include, but are not limited to multiple budgets, such as, but not limited to macro, category, commercial, micro, groups, sales, production, cash flow, marketing, project expenditure, businesses, and/or other budgets a user may desire to product.

The system may aid the user or completely set up the budget for the user utilizing several factors, including but not limit to utilizing the user's financial plans, the user's financial history, similarly situated individuals' financial history, crowd sourcing data, financial advisor recommendations, and/or the like to set up the user's budget. Financial plans of a user may include financial goals, payment strategies, tax strategies, personal planning, loan repayment (e.g., student loan repayment, car loan repayment, etc.), paying off credit card debt (e.g., paying off one credit card with higher interest rates faster than other debt), mortgage repayment and/or the like. The financial goals of the user may include savings goals, such as saving for a child's college, investments, saving to reach a specific amount, saving to purchase a specific product, retirement savings goals, etc. Personal planning may include vacation planning, job loss planning, emergency planning, and social networking data.

User financial history includes payment strategies of the user may have previously implemented, previous earnings, previous purchasing habits, previously used purchase methods, previous bills, etc. that may be used by the system to determine a budget that may be suitable for the user to implement. Similarly situated individuals' financial history includes the system reviewing and determining budgets for individuals that are in the similar financial, local, age, etc. position as the user. In this way, the user receives aggregate data for other individuals that are similarly situated to provide the user a budget.

In some embodiments, the system may populate a user's wish list. In some embodiments, the wish list may be populated manually by the user, using an interface and/or the like. In some embodiments, the wish list may be set up automatically by the system for the user. In yet other embodiments, the wish list may be set up via a combination of user input and system automatic wish list population. The user's wish list is a list that includes products that the user may wish to purchase or is planning to purchase in the future. These products may then be monitored for price changes, discounts, merchants providing the product, similar products, comments/reviews of the product, promotional offers for the product, accompanying products, and/or the like. The real-time video image of the product may be incorporated into the user's wish list such that upon selection of the wish list, information about the product will be available to the user in real-time. In this way, the system may be able to receive images of the products the user may wish to provide to the user's wish list, identify those products and update the user's wish list with those products.

In some embodiments, the system provides a directory that comprises both the user budge and the user wish list. In this way, the products and/or budget data that is captured via real-time video, photograph, still image, internet, and/or the like may be provided to either the budget, the wish list, and/or a combination thereof. In this way, information may be exchanged between the budget and/or the wish list. For example, if the user selects a vehicle to be on his/her wish list, then the system may also provide the user with an updated budget that includes the vehicle incorporated into the budget.

In some embodiments, the system may identify specific information about the product and/or budget data, such as the product, price, transaction, entity associated with the product and/or budget data, etc. In this way, the system may be able to identify the product and/or budget data using the image provided to the system from the real-time video stream. Using the specific information identified about the product and/or the budget data, the system may be able to populate the user's directory, including the user's budget and/or the user's wish list, with the specific information. In this way, the system may receive a real-time video image of a product, for example, a television. The system may then identify the specifics about the television, such as, but not limited to the brand, manufacturer, model, merchants selling the television, prices, discounts, comments/reviews, etc. The system may then provide the user directory with this data such that the user's budget and/or wish list may be populated.

In some embodiments, the system may provide selectable indicators associated with the product and/or budget data in the real-time video stream. One or more indicators are presented on the display of the mobile device in conjunction with the real-time video stream. Each of the indicators corresponds with an image determined to be a product and/or budget data. The indicator may take various forms, such as a display of a tag, a highlighted area, a hot-spot, and/or the like. In some embodiments, the indicator is a selectable indicator, such that the user may select (e.g., click-on, hover-over, touch the display, provide a voice command, etc.) the product, budget data, or indicator to provide display of specific information related to the product and/or budget data, including for instance real-time information about the user's budget and/or wish list and the potential impact that the product and/or budget data may have on the user's budget and/or wish list. In other embodiments, the indicator itself may provide the information or a portion of the information. For example, a user may wish to purchase a television; the user may use real-time vision object recognition to recognize that the television within an isle at a retail store. The real-time vision object recognition may consider the located at a specific retail store, the characteristics of the television such as brand, quality, etc., and price of the television. The user may select the indicator. In some embodiments, the selected indicator may display what the user's budget may look like in the future based on the user's potential purchase of the product. In other embodiments, the selected indicator may display what the user's wish list with the product incorporated into the wish list.

Furthermore, the display of the real-time video stream on a mobile device may also provide the user with a direct video or audio conference with the user's financial advisor. In this way, the user may be provided instant advisement from his financial advisor for advice when purchasing major purchases or when the user is facing significant financial decisions.

Finally, the system may provide the user with the ability to purchase a product located within the real-time video stream. In this way, the user may select his/her budget and/or wish list and purchase the product. The product may be purchased on-line, through a merchant, etc. using a mobile device.

Embodiments of the invention relate to systems, methods, and computer program products for populating a user directory, comprising: receiving financial information for a user, wherein the financial information provides an indication of financial history of the user; identifying, by a computer device processor, one or more products proximate in location to a mobile device; determining a location in the user directory to populate with the one or more products, wherein the user directory comprise at least one of a user budget or a user wish list; receiving information about one or more products in the user directory, wherein the information about one or more products comprises a price associated with the one or more products; presenting, via the mobile device, a selectable indicator associated with the product, wherein the indicators provides real-time impact on the user directory based at least in part on the information about the one or more products identified proximate in location to the mobile device; and providing access to the user directory by selection of the indicator associated with the product, such that the at least one of the user budget or the user wish list is accessible.

In some embodiments, the invention may further comprise providing the user with real-time loan procurement for purchasing the one or more products proximate in location to the mobile device, wherein the real-time loan procurement is based at least in part on the receiving of financial information for a user.

In some embodiments, the invention may further comprise providing a communicable link between the user and a financial advisor, via the mobile device, such that the financial advisor can advise the user based on the real-time impact that purchasing one or more products proximate in location to the mobile device would have on the user budget and the user wish list. In some embodiments, the real-time impact on the user directory further comprises the real-time impact that purchasing the one or more products proximate in location to the mobile device would have on the at least one of the user budget or the user wish list.

In some embodiments, identifying one or more products further comprises capturing a tag located on or proximate to one or more of the products and reading the tag to identify the product. Identifying one or more products may further comprise capturing real-time video of the one or more products product. Identifying one or more products may still further comprise capturing, via the mobile device, images of the one or more products. Capturing images further comprises implementing, via a computer device processor, object recognition processing to identify one or more images that correspond to one or more products.

In some embodiments, the user directory further comprises the user budget and the user wish list.

In some embodiments, the invention may further comprise developing a budget strategy, wherein the budget strategy is based at least in part on said receiving financial information for the user, wherein the receiving financial information comprises at least one of user transaction history, user income, user financial plans, or user personal plans.

In some embodiments, presenting an indicator associated with the product further comprises superimposing the indicator over real-time video that is captured by the mobile device, wherein the indicator is selectable by the user. In some embodiments, one or more products further comprise budget data, wherein budget data includes financial documents that influence the user budget or user wish list.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
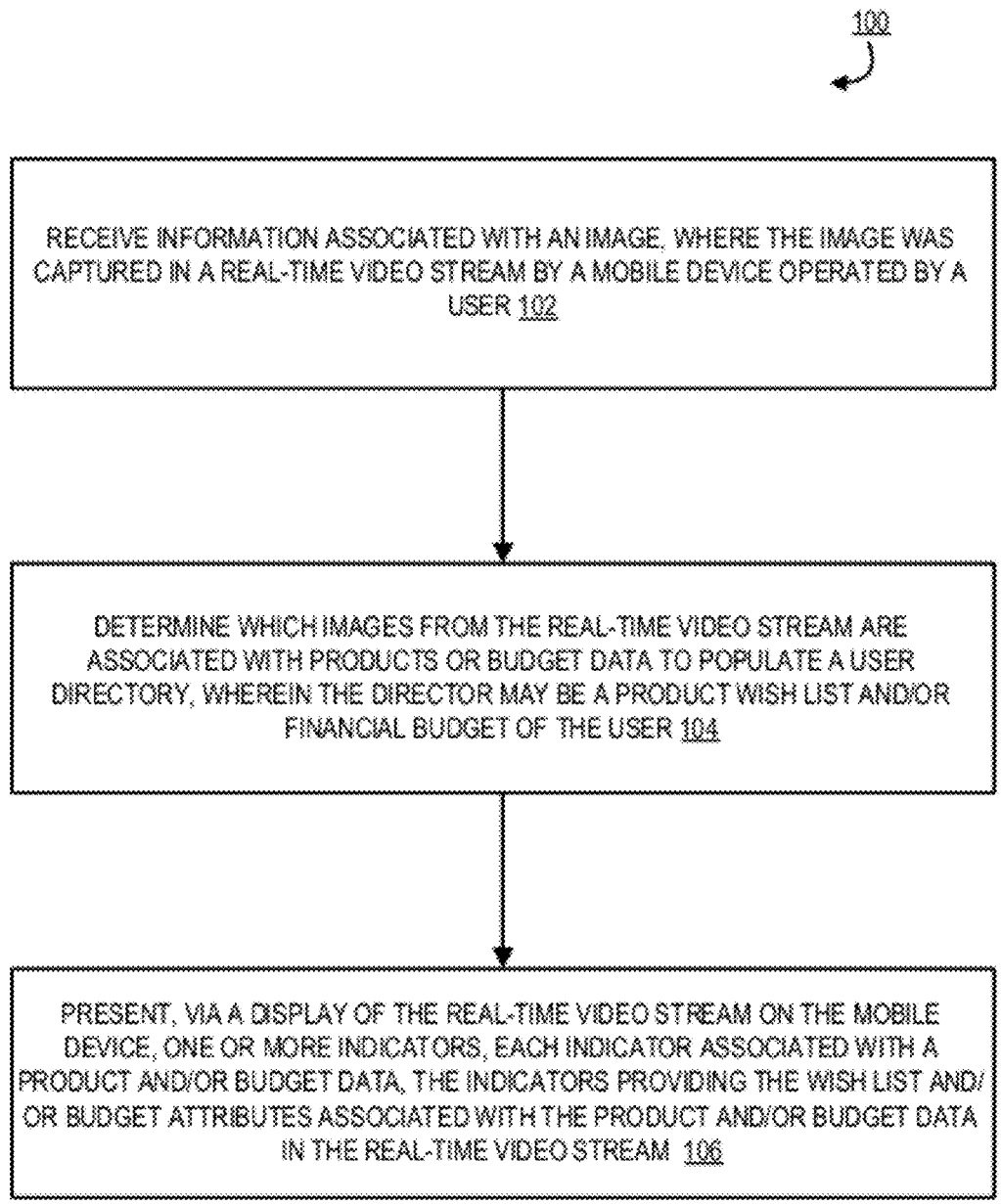
Figure 2:
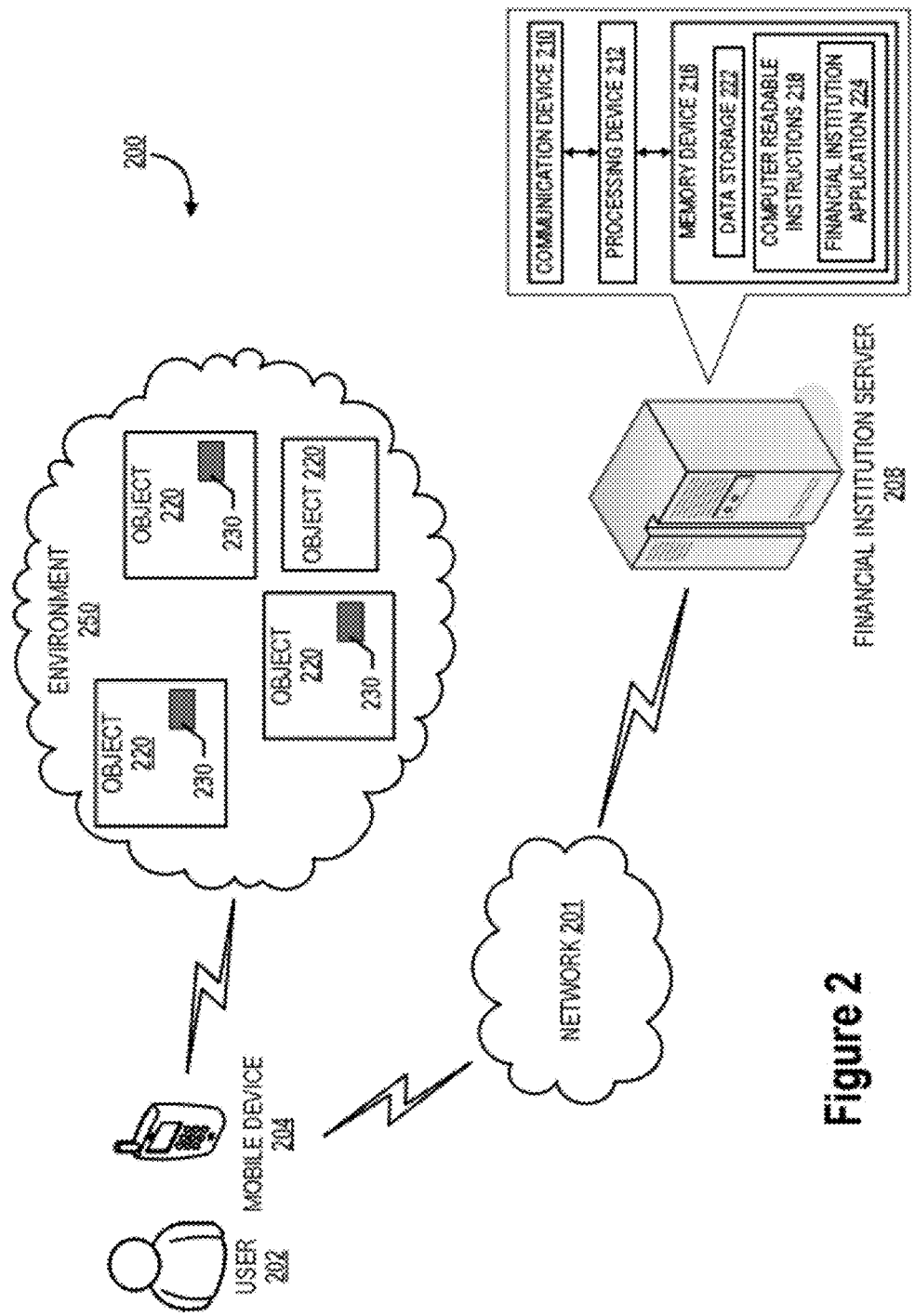
Figure 3:
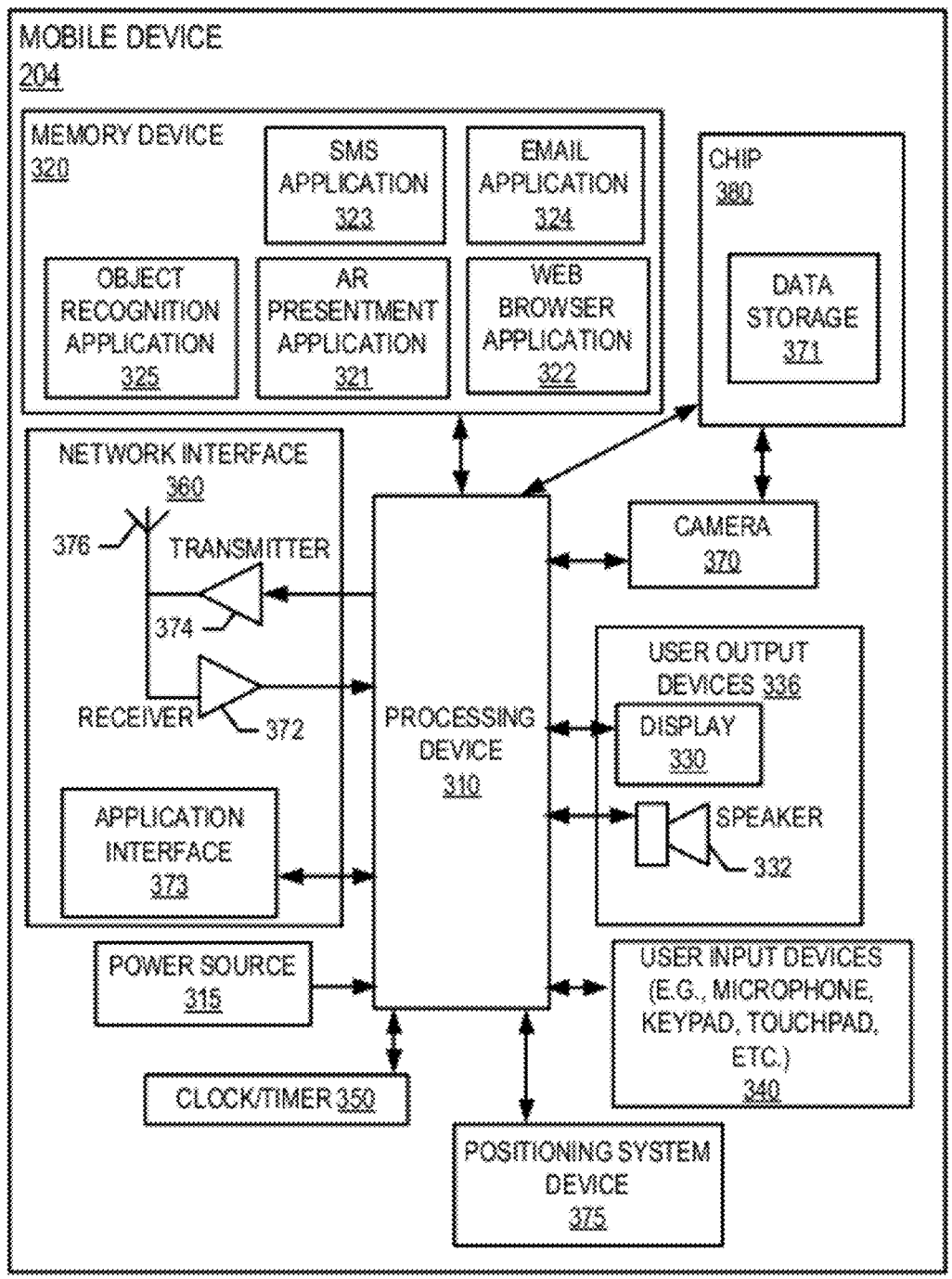
Figure 4:
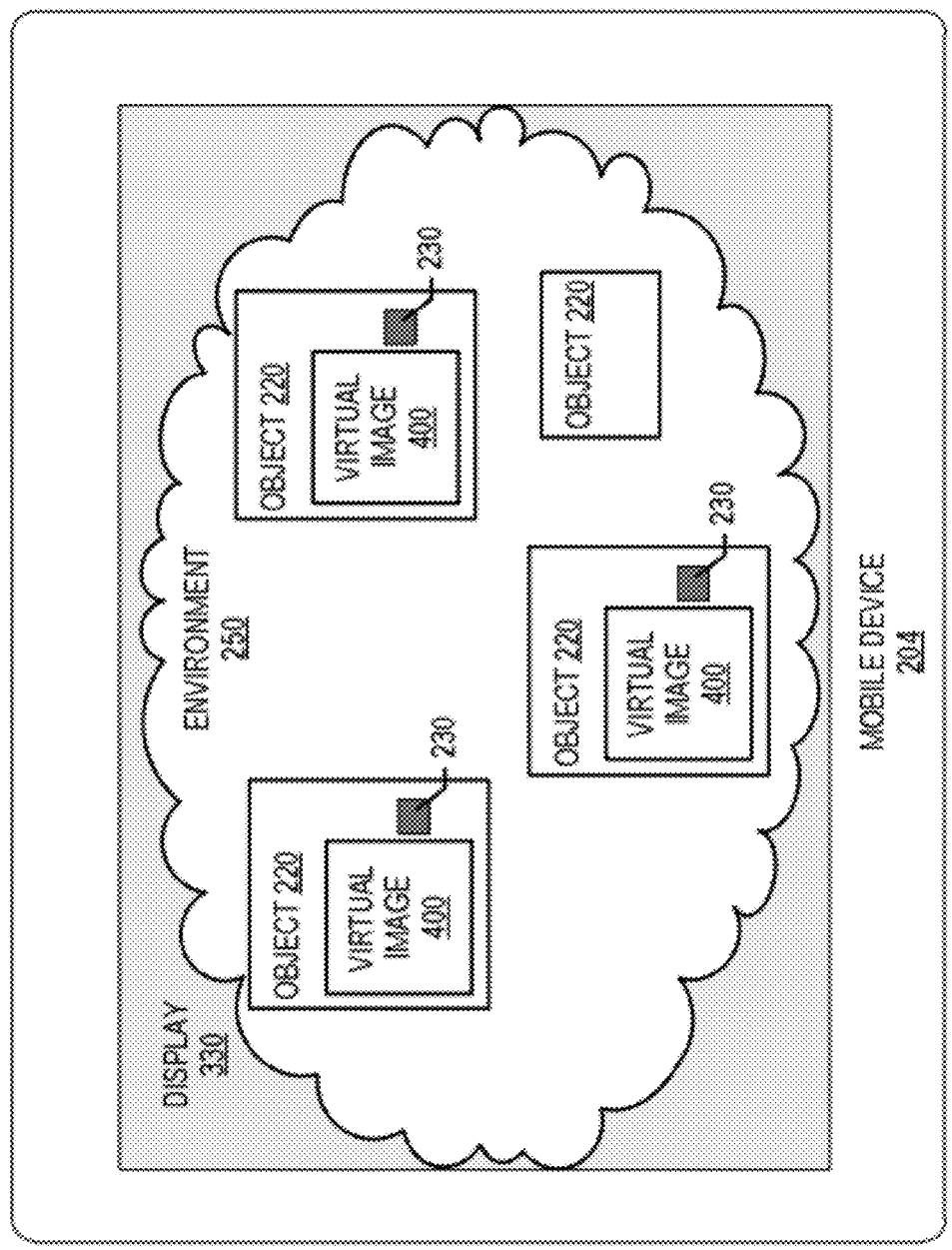
Figure 5:
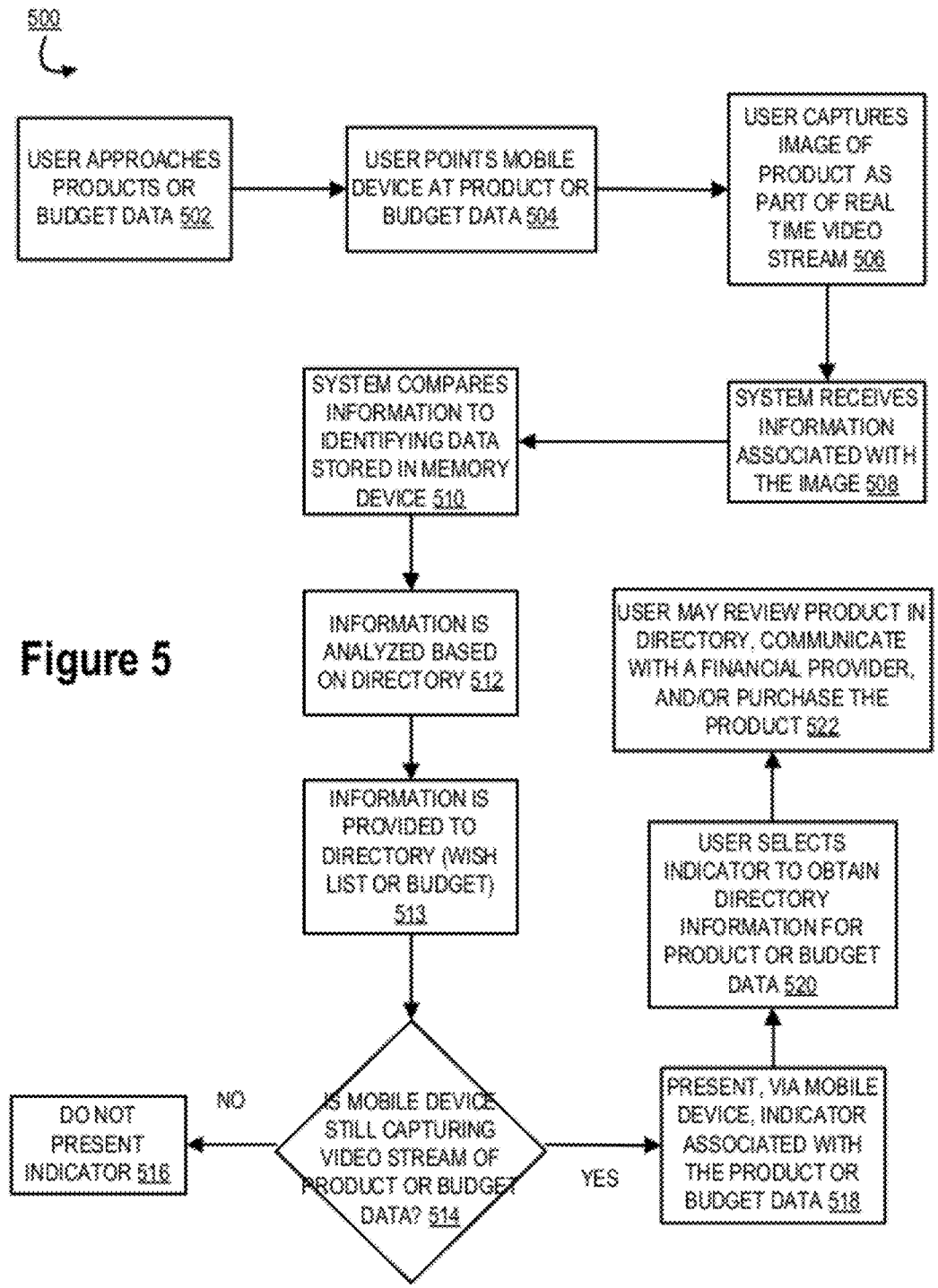
Figure 6:
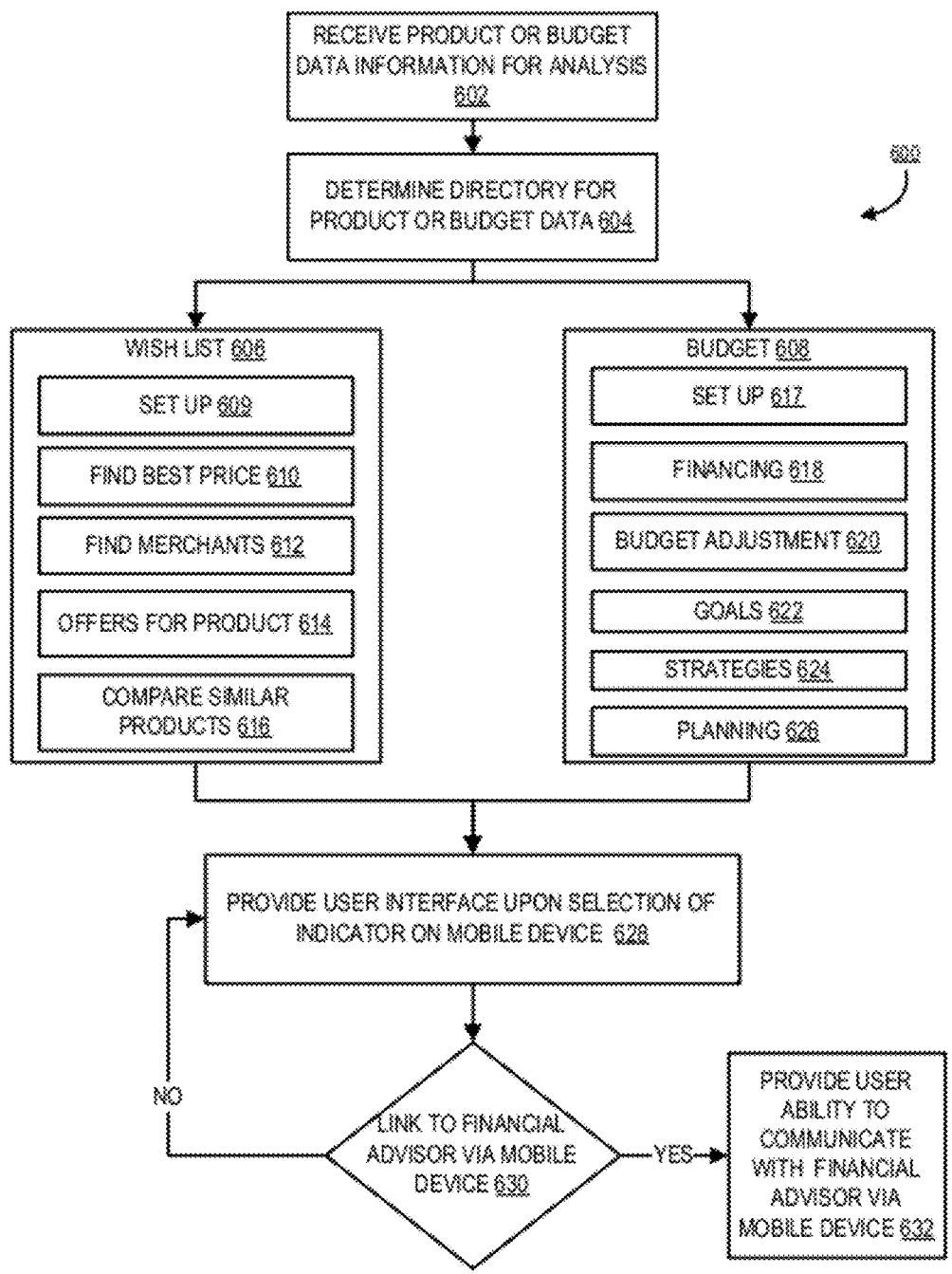
Figure 8:
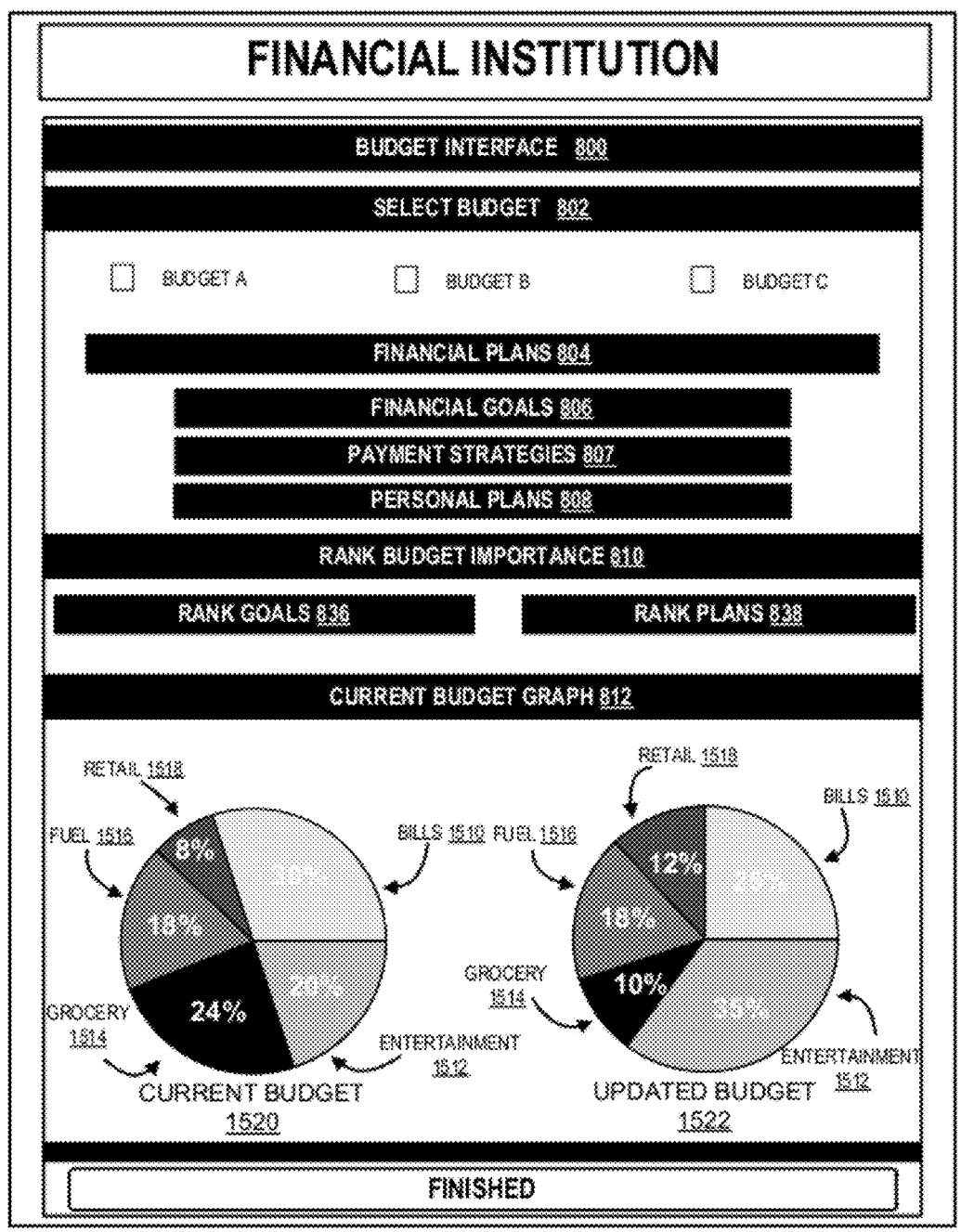

Having thus described embodiments of the invention in general terms, reference will now be made to the accompanying drawings, which are not necessarily drawn to scale, and wherein:

FIG. 1 provides a high level process flow illustrating a real-time populating of user directory for budget and/or wish list recommendation process, in accordance with one embodiment of the present invention;

FIG. 2 provides a populating user directory for budget and/or wish list recommendation system environment, in accordance with an embodiment of the invention;

FIG. 3 provides a block diagram illustrating a mobile device, in accordance with an embodiment of the invention;

FIG. 4 provides an a representation illustrating a mobile device real-time video stream display environment, in accordance with an embodiment of the invention;

FIG. 5 provides a process map for populating a user directory, in accordance with an embodiment of the invention;

FIG. 6 provides a process map for the analyzing the real-time video stream to determine a budget and/or wish list recommendation based on the populated directory, in accordance with an embodiment of the invention;

FIG. 7 provides a wish list interface, in accordance with an embodiment of the invention; and FIG. 8 provides a budget interface, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer payment account systems to users. Furthermore, as used herein, the term "product" shall mean any good, service, event, etc. that may be provided to populate a user wish list and/or a budget. Finally, the term "budget data" as used herein shall mean any product, document, statement, bill, financial record, etc. that may be used to populate a user budget and/or wish list. In this way, budget data may include any data that the user may wish to include into his/her budget or use to set up his/her budget.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

Furthermore, embodiments of the invention generally describe a "user directory" or "directory." It will be appreciated by one of ordinary skill in the art that a directory may comprise any data that may be required for a wish list and/or budget. Furthermore, the term directory as described herein may include a budget, a wish list, and/or a combination thereof.

FIG. 1 illustrates a high level process flow of a real-time populating of a user directory for budget and/or wish list recommendation process 100, which will be discussed in further detail throughout this specification with respect to FIGS. 2 through 8. The first step in the populating of a user directory for budget and/or wish list recommendation process 100 is to receive information associated with an image, where the image was captured by a mobile device using real-time video stream, the mobile device operated by a user, as illustrated by block 102. A real-time video stream may include images of products, images of budget data, and/or the like. For example, a user may move about an aisle within a retail location while capturing a real-time video stream of the environment including the products on the shelves in the aisle. In another example, a user may capture a real-time video stream of budget data, such as an electric bill the user has received.

Next, in block 104 a determination is made as to which images from the real-time video stream are associated with products and/or budget data to populate a user directory. The user directory comprising a user wish list and/or a user budget. The determination is made by analyzing the real-time video stream for objects, logos, artwork, and/or other product-indicating features or business-indications features to determine what the products and/or budget data are within the video stream and to then incorporate the product and/or budget data into the user's directory, such that the product and/or budget data may be incorporated into the user's wish list and/or the user's budget. In some embodiments, the product and/or budget data may be provided via real-time video stream, voice communications, text communications, and/or the like. In some embodiments, a wish list is a list that includes products that the user may wish to purchase or is planning to purchase in the future. These products may then be monitored for price changes, discounts, etc. as well as being able to incorporate product of the user's wish list into the user's budget, such that the user may be able to receive an indication as to the impact of purchasing a product on the wish list with respect to his/her future financial state. In some embodiments, a budget provides a financial plan that forecasts revenues and expenditures, such that a model of financial performance may be obtained if certain strategies, evens, and/or plans are carried out. Budgets may include plans for saving, borrowing, and/or spending. Budgets may be utilized for macro, category, commercial, micro, groups, sales, production, cash flow, marketing, project expenditure, businesses, and/or any other potential budgeting requirement. The budgets may be used by any user, including but not limited to individuals, families, businesses, and/or other entities.

Thereafter, at block 106 one or more indicators are presented on the display of the mobile device in conjunction with the real-time video stream. The indicator may take various forms, such as display of a tag, a highlighted area, a hot-spot, or the like. In specific embodiments, the indicator is a selectable indicator, such that a user may select (e.g., click-on, hover-over, touch the display, provide a voice command, and/or the like) the product or indicator to provide display of specific information related to the product, including but not limited to budgets with that product incorporated in, budget impact data, financing options for the product, true cost of credit if the product is purchased, user wish list incorporating the product, and/or the like. In some embodiments, the indicator itself may provide the information or a portion of the information to the user.

FIG. 2 illustrates a populating user directory for budget and/or wish list recommendation system environment 200, in accordance with one embodiment of the present invention and is only one example of an embodiment of a populating user directory for budget and/or wish list recommendation system environment 200, and it will be appreciated that in other embodiments one or more of the systems, devices, or servers may be combined into a single system, device, or server, or be made up of multiple systems, devices, or servers. As illustrated in FIG. 2, the financial institution server 208 is operatively coupled, via a network 201 to the mobile device 204. In this way, the financial institution server 208 can send information to and receive information from the mobile device 204, to associate indicators within the real-time video stream to a recommended appropriate payment account.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual. In other embodiments, the user 202 may be associated with a business, company, and/or other entity that may wish to utilize the system for budgeting and/or wish list functionality. The user 202 may be at a retail store, near a service center, at his/her home, and/or within real-time video range of any product and/or budget data the user 202 may wish to provide to the user 202 directory to incorporate into a wish list and/or budget.

As illustrated in FIG. 2, the financial institution server 208 generally comprises a communication device 210, a processing device 212, and a memory device 216. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 212 is operatively coupled to the communication device 210 and the memory device 216. The processing device 212 uses the communication device 210 to communicate with the network 201 and other devices on the network 201, such as, but not limited to the mobile device 204. As such, the communication device 210 generally comprises a modem, server, or other device for communicating with other devices on the network 201.

In some embodiments, the processing device 212 may also be capable of operating one or more applications, such as one or more applications functioning as an artificial intelligence ("AI") engine. The processing device 212 may recognize objects that it has identified in prior uses by way of the AI engine. These objects may include products and/or budged data. In this way, the processing device 212 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

As further illustrated in FIG. 2, the financial institution server 208 comprises computer-readable instructions 218 stored in the memory device 216, which in one embodiment includes the computer-readable instructions 218 of a financial institution application 224. In some embodiments, the memory device 216 includes data storage 222 for storing data related to the budgets and wish lists populated including but not limited to data created and/or used by the financial institution application 224 and/or used to populate and keep up to date budgets and wish lists.

In the embodiment illustrated in FIG. 2 and described throughout much of this specification, the financial institution application 224 may provide the user of mobile device real-time budget and/or wish list updates incorporating product and/or budget data located in a real-time video stream by recognizing that an object (either a product and/or budget date) is being captured in the real-time video stream, analyze the object to determine the correct location for the object in the directory, add the object to the directory (including budgets and/or wish lists), update the directory in real-time to incorporate the object, provide indications associated with the object to the user 202, and allow the user 202 to set-up personal preferences associated with the directory.

In some embodiments, the directory comprises a budget and a wish list for the user 202. A user budget may provide the user 202 with real-time indication as to how purchasing a product may affect the user's budget, a future budget based on the purchasing of the product, etc. In some embodiments, wish list may provide the user 202 with real-time indications as to the user's current wish list, current prices for products on the wish list, etc.

Through the use of real-time vision object recognition, objects, logos, artwork, products, locations and other features that can be recognized in a real-time video stream, a still image, a photograph, image, vehicle recognized image, etc. The object can be matched to data associated with those objects, logos, artwork, products, locations, or other features to determine products and/or budget data located within those images. In this way, the financial institution application 224 may recognize and identify products and/or budget data located within a real-time video stream or the like.

In some embodiments, as described in further detail below, the financial institution application 224 may recognize a marker 230 and/or objects 220 within an environment 250. The marker 230 may be interpreted with respect to data in the memory device 216 and be recognized as possible products and/or services that may be available to the user 202. In this way, the financial institution server 208 provides marker 230 interpretation and analysis with respect to the data on the financial institution server 208.

The financial institution application 224 may then analyze the objects to determine which products in the real-time video stream are products that the user 202 may wish to add to his/her wish list and/or budget. The product and/or budget data may be determined from the objects in the images provided to the system via real-time video stream, still image, photograph, image, vehicle recognized image, etc. Products may include any good, service, etc. that a user may wish to purchase. For example, a user may provide real-time video images of a television that the user wishes to purchase. Budget data may include any product, document, statement, bill, financial record, etc. that the user may wish to incorporate into his/her budget. In this way, the user 202 may be able to capture an image of a product and/or budget data and the product and/or budget data in that image may be provided to the user's wish list and/or the user's budget, such that the user 202 has real-time wish list and budget data available. For example, if a user 202 is wishing to purchase a vehicle, the user 202 may take an image of the vehicle, the financial institution application 224 may recognize the vehicle and provide data associated with the vehicle to the user's budged. In this way, the user 202 may be able to receive information about how purchasing the vehicle may effect his/her budget in the future, best payment mechanism to purchase the vehicle, how to receive a loan to purchase the vehicle, and/or if purchasing the vehicle is recommended based on the user's budgeting strategy. In other embodiments, the products and/or budget data that have been previously determined may be recognized with when images of the product and/or budget data are located within the real-time video stream. For example, if a user 202 has previously put a specific television on his/her wish list. The user 202 may use his/her real-time video stream to scan a planogram, down a street, a virtual store, etc. The financial institution application 224 may then identify the television and the location within the planogram, merchant location on the street, and/or location in the virtual store, such that the user 202 may be able to locate the products on his/her wish list using the system.

The financial institution application 224 may then add the products and/or budget data associated with the objects in the real-time video stream to the user's directory. In some embodiments, the financial institution application 224 may identify specific information about the product and/or budget data, such as the product, price, transaction, entity associated with the product and/or budget data, etc. Using the specific information identified about the product and/or the budget data, the financial institution application 224 may be able to populate the user's directory, including the user's budget and/or the user's wish list, with the specific information. For example, the financial institution application 224 may receive a real-time video image of a product, for example, a television. The financial institution application 224 may then identify the specifics about the television, such as, but not limited to the brand, manufacturer, model, merchants selling the television, prices, discounts, comments/reviews, etc. The financial institution application 224 may then provide the user directory with this data such that the user's budget and/or wish list may be populated.

The directory may be stored in the memory device 216 of the financial institution server 208. The directory comprises both the user budge and the user wish list. In this way, the products and/or budget data that are captured via real-time video, photograph, still image, internet, and/or the like may be provided to the budget, the wish list, and/or a combination thereof. In this way, information may be exchanged between the budget and/or the wish list within the directory. For example, if the user 202 selects a vehicle to be on his/her wish list, then the system may also provide the user with an updated budget that includes the vehicle incorporated into the budget.

The financial institution application 224 may populate the user's budget and/or wish list by directing information to the directory in the memory device 216 of the financial institution server 208. In some embodiments, the financial institution application 224 may populate the budget within the directory with information about products and/or budget data determined from the real-time video stream. In other embodiments, the financial institution application 224 may populate the wish list within the directory with information about products and/or budget data determined from the real-time video stream. In yet other embodiments, the financial institution application 224 may populate both the budget and the wish list within the directory with information about products and/or budget data determined from the real-time video stream.

In some embodiments, the financial institution application 224 may populate the user's budget within directory. In some embodiments, the information that the financial institution application 224 utilizes to populate the budget may be from user 202 inputted information. The information may be provided to the financial institution application 224 via an interface or the like information to populate the user's budget and/or the user's budget strategy. In other embodiments, the financial institution application 224 may automatically set up a user's budget and/or budget strategy. In yet other embodiments, a combination of user 202 inputs and financial institution application 224 automatic set up may be utilized to populate a budget and/or budget strategy.

The financial institution application 224 may aid the user 202 or completely set up and populate the budget for the user 202 utilizing several factors, including but not limit to utilizing the user's financial plans, the user's financial history, similarly situated individuals' financial history, crowd sourcing data, financial advisor recommendations, and/or the like. Financial plans of a user may include financial goals, payment strategies, tax strategies, personal planning, loan repayment (e.g., student loan repayment, car loan repayment, etc.), paying off credit card debt (e.g., paying off one credit card with higher interest rates faster than other debt), mortgage repayment and/or the like. The financial goals of the user may include savings goals, such as saving for a child's college, investments, saving to reach a specific amount, saving to purchase a specific product, retirement savings goals, etc. Personal planning may include vacation planning, job loss planning, emergency planning, and social networking data. The financial institution application 224 may via the communication device 210 to communication with the other systems on the network, such as, but not limited to mobile devices 204. In this way, the financial institution application 224 may utilize the financial institution server 208 and the other systems on the network 201 to determine information listed able to set up and/or populate the budget.

In some embodiments, the financial institution application 224 may set up and populate a user's wish list. In some embodiments, the financial institution application 224 may allow the user 202 to populate the wish list, using an interface, such as the one illustrated in FIG. 7. In some embodiments, the wish list may be set up automatically by the financial institution application 224 for the user 202. In yet other embodiments, the wish list may be set up and populated via a combination of user 202 input and by the financial institution application 224.

In some embodiments, the financial institution application 224 may update the user's directly in real-time to incorporate the products and/or budget data that is located in the real-time video stream. In this way, the financial institution application 224 may incorporate the products and/or budget data into the directory, such that the financial institution application 224 may provide the user 202 with real-time updates to the user's budget and/or user's wish list. For example, if the user 202 is taking a real-time video stream of a vehicle, the vehicle may be recognized by the financial institution application 224 and information about the vehicle may be incorporated into the user's budget and/or wish list.

The financial institution application 224 may also provide the user 202 with a direct video or audio conference with the user's financial advisor. In this way, the user 202 may be provided instant advisement from his/her financial advisor for advice when purchasing major purchases or when the user 202 is facing significant financial decisions.

The financial institution application 224 may provide the user 202 with the ability to purchase a product located within the real-time video stream. In this way, the user 202 may select his/her budget and/or wish list and purchase the product using the user's mobile device 204.

The financial institution application 224 may also allow the user 202 to set up and edit personal preferences associated with the directory. In this way, the financial institution application 224 allows the user 202 may be able to set up the type of budget, wish list, etc. that may fit his/her needs.

As further illustrated is FIG. 2 is an environment 250. The user 202 may utilizes a mobile device 204 to capture real-time video of an environment 250 in an augmented reality experience. As described in further detail below with respect to FIG. 3, the mobile device 204 may be any mobile communication device. The mobile device 204 has the capability of capturing real-time video, an image, a picture from the Internet, and/or the like of the surrounding environment 250. The real-time video or image capture may be by any means known in the art, such as for example, a mobile telephone equipped with a camera capable of video capture.

The environment 250 contains a number of objects 220. Objects 220 include, but are not limited to products and/or services for which the user 202 may wish to view a recommended appropriate payment account. For example, an object 220 may be a product, such as a television, vehicle, computer, etc. or an object 220 may be a budget data, such as a bill, statement, check, etc. Some of such objects 220 may include a marker 230 identifiable by the mobile device 204 or application accessible through the mobile device 204. A marker 230 may be any type of marker that is a distinguishing feature that can be interpreted to identify specific objects 220. In some embodiments, the marker 230 may be interpreted by the mobile device 204. In other embodiments, the marker 230 may be interpreted by the financial institution server 208. In yet other embodiments, the marker 230 may be interpreted by both the mobile device 204 and the financial institution server 208. For instance, a marker 230 may be alpha-numeric characters, symbol, logo, shape, ratio of size of one feature to another feature, a product identifying code such as a bar code, electromagnetic radiation such as radio waves (e.g., radio frequency identification (RFID)), architectural features, color, etc. In some embodiments, the marker 230 may be audio and the mobile device 204 may be capable of utilizing audio recognition to identify words or unique sounds broadcast by the products, service, location, merchant, etc. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc.

In some embodiments, the marker 230 is not actually a physical marker located on or being broadcast by the object 220. For instance, the marker 230 may be some type of identifiable feature that is an indication that the object 220 is nearby. In some embodiments, the marker 230 for an object 220 may actually be the marker 230 for a different object 220. For example, the mobile device 204 may recognize a particular building as being "Building A." Data stored in the data storage 371 may indicate that "Building B" is located directly to the east and next to "Building A." Thus, marker 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 204 and/or the financial institution application 224 to interpret to a desired confidence level what the object is. For example, the mobile device 204, object recognition application 325 and/or AR presentation application 321 may be used to identify a particular person as a first character from a popular show, and thereafter utilize the information that the first character is nearby features of other characters to interpret that a second character, a third character, etc. are nearby, whereas without the identification of the first character, the features of the second and third characters may not have been used to identify the second and third characters.

The marker 230 may also be, or include, social network data, such as data retrieved or communicated from the Internet, such as tweets, blog posts, social networking site posts, various types of messages and/or the like. In other embodiments, the marker 230 is provided in addition to social network data as mentioned above. For example, mobile device 204 may capture a video stream and/or one or more still shots of a large gathering of people. In this example, as above, one or more people dressed as characters in costumes may be present at a specified location. The mobile device 204, object recognition application 325, and/or the AR presentation application 321 may identify several social network indicators, such as posts, blogs, tweets, messages, and/or the like indicating the presence of one or more of the characters at the specified location. In this way, the mobile device 204 and associated applications may communicate information regarding the social media communications to the user and/or use the information regarding the social media communications in conjunction with other methods of object recognition. For example, the mobile device 204 object recognition application 325, and/or the AR presentation application 321 performing recognition of the characters at the specified location may confirm that the characters being identified are in fact the correct characters based on the retrieved social media communications. This example may also be applied objects outside of people.

In some embodiments, the mobile device and/or server accesses one or more other servers, social media networks, applications and/or the like in order to retrieve and/or search for information useful in performing an object recognition. In some embodiments, the mobile device and/or server accesses another application by way of an application programming interface or API. In this regard, the mobile device and/or server may quickly search and/or retrieve information from the other program without requiring additional authentication steps or other gateway steps.

While FIG. 2 illustrates that the objects 220 with markers 230 only include a single marker 230, it will be appreciated that the object 220 may have any number of markers 230 with each equally capable of identifying the object 220. Similarly, multiple markers 230 may be identified by the mobile device 204 such that the combination of the markers 230 may be utilized to identify the object 220. For example, the facial recognition may identify a person as a famous athlete, and thereafter utilize the uniform the person is wearing to confirm that it is in fact the famous athlete.

In some embodiments, a marker 230 may be the location of the object 220. In such embodiments, the mobile device 204 may utilize GPS software to determine the location of the user 202. As noted above, a location-based marker 230 could be utilized in conjunction with other non-location-based markers 230 identifiable and recognized by the mobile device 204 to identify the object 220. However, in some embodiments, a location-based marker 230 may be the only marker 230. For instance, in such embodiments, the mobile device 204 may utilize GPS software to determine the location of the user 202 and a compass device or software to determine what direction the mobile device 204 is facing in order to identify the object 220. In still further embodiments, the mobile device 204 does not utilize any GPS data in the identification. In such embodiments, markers 230 utilized to identify the object 220 are not location-based.

FIG. 3 illustrates an embodiment of a mobile device 204 that may be configured to execute augmented reality functionality. A "mobile device" 204 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, vehicle mounted apparatuses, vehicles, any combination of the aforementioned, or the like.

The mobile device 204 may generally include a processing device 310 communicably coupled to such devices as a memory device 320, user output devices 336, user input devices 340, a network interface 360, a power source 315, a clock or other timer 350, a camera 370, a positioning system device 375, one or more chips 380, etc.

In some embodiments, the mobile device 204 and/or the server access one or more databases or datastores (not shown) to search for and/or retrieve information related to the object and/or marker. In some embodiments, the mobile device 204 and/or the server access one or more datastores local to the mobile device 204 and/or server and in other embodiments, the mobile device 204 and/or server access datastores remote to the mobile device 204 and/or server. In some embodiments, the mobile device 204 and/or server access both a memory and/or datastore local to the mobile device 204 and/or server as well as a datastore remote from the mobile device 204 and/or server.

The processing device 310 may include functionality to operate one or more software programs or applications, which may be stored in the memory device 320. For example, the processing device 310 may be capable of operating a connectivity program, such as a web browser application 322. The web browser application 322 may then allow the mobile device 204 to transmit and receive web content, such as, for example, location-based content and/or other web page content, according to a Wireless Application Protocol (WAP), Hypertext Transfer Protocol (HTTP), and/or the like.

The processing device 310 may also be capable of operating applications, such as an object recognition application 325 and/or an AR presentment application 321. The object recognition application 325 and/or AR presentment application 321 may be downloaded from a server and stored in the memory device 320 of the mobile device 204. Alternatively, the object recognition application 325 and/or AR presentment application 321 may be pre-installed and stored in a memory in the chip 380. In such an embodiment, the user 202 may not need to download the object recognition application 325 and/or the AR presentment application 321 from a server. In this way, the object recognition application 325 and/or the AR presentment application 321 may remain at the server, such as the financial institution server 208, within the financial institution application 224.

The object recognition application 325 provides the mobile device 204 with object recognition capabilities. In this way, objects 220 such as products and/or the like may be recognized by the object 220 itself and/or markers 230 associated with the objects 220. This is described in further detail below with respect to FIG. 4. In this way the object recognition application 325 may communicate with other devices on the network 201 to determine the object 220 within the real-time video stream.

The AR presentment application 321 provides the mobile device 204 with AR capabilities. In this way, the AR presentment application 321 may provide superimposed indicators related to the object 220 in the real-time video stream, such that the user 202 may have access to the targeted offers by selecting an indicator superimposed on the real-time video stream. The AR presentment application 321 may communicate with the other devices on the network 201 to provide the user 202 with indications associated with targeted offers for objects 202 in the real-time video display. The presentation and selection of indicators provided to the user 202 via the AR presentment application 321 is described in further detail below with respect to FIG. 5.

In some embodiments, the processor 310 may also be capable of operating one or more applications, such as one or more applications functioning as an artificial intelligence ("AI") engine. The processor 310 may recognize objects that it has identified in prior uses by way of the AI engine. In this way, the processor 310 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device 204 and/or server, an indication that the object may be the same object previously recognized. In this regard, the AI engine may provide a baseline or starting point from which to determine the nature of the object. In other embodiments, the AI engine's recognition of an object is accepted as the final recognition of the object.

The chip 380 may include the necessary circuitry to provide both object recognition and AR functionality to the mobile device 204. Generally, the chip 380 will include data storage 371 which may include data associated with the objects within a real-time video stream that the object recognition application 325 identifies as having a certain marker(s) 230. The chip 380 and/or data storage 371 may be an integrated circuit, a microprocessor, a system-on-a-chip, a microcontroller, or the like. As discussed above, in one embodiment, the chip 380 may provide both object recognition and/or the AR functionality to the mobile device 204.

Of note, while FIG. 3 illustrates the chip 380 as a separate and distinct element within the mobile device 204, it will be apparent to those skilled in the art that the chip 380 functionality may be incorporated within other elements in the mobile device 204. For instance, the functionality of the chip 380 may be incorporated within the memory device 320 and/or the processing device 310. In a particular embodiment, the functionality of the chip 380 is incorporated in an element within the mobile device 204 that provides the object recognition and AR capabilities to the mobile device 204. Still further, the chip 380 functionality may be included in a removable storage device such as an SD card or the like.

The processing device 310 may be configured to use the network interface 360 to communicate with one or more other devices on a network 201 such as, but not limited to the financial institution server 208. In this regard, the network interface 360 may include an antenna 376 operatively coupled to a transmitter 374 and a receiver 372 (together a "transceiver"). The processing device 310 may be configured to provide signals to and receive signals from the transmitter 374 and receiver 372, respectively. The signals may include signaling information in accordance with the air interface standard of the applicable cellular system of the wireless telephone network that may be part of the network 201. In this regard, the mobile device 204 may be configured to operate with one or more air interface standards, communication protocols, modulation types, and access types. By way of illustration, the mobile device 204 may be configured to operate in accordance with any of a number of first, second, third, and/or fourth-generation communication protocols and/or the like. For example, the mobile device 204 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 204 may also be configured to operate in accordance with non-cellular communication mechanisms, such as via a wireless local area network (WLAN) or other communication/data networks.

The network interface 360 may also include an application interface 373 in order to allow a user 202 to execute some or all of the above-described processes with respect to the object recognition application 325, the AR presentment application 321 and/or the chip 380. The application interface 373 may have access to the hardware, e.g., the transceiver, and software previously described with respect to the network interface 360. Furthermore, the application interface 373 may have the ability to connect to and communicate with an external data storage on a separate system within the network 201. In some embodiments, the external AR data is stored in the memory device 216 of the financial institution server 208.

As described above, the mobile device 204 may have a user interface that includes user output devices 336 and/or user input devices 340. The user output devices 336 may include a display 330 (e.g., a liquid crystal display (LCD) or the like) and a speaker 332 or other audio device, which are operatively coupled to the processing device 310. The user input devices 340, which may allow the mobile device 204 to receive data from a user 202, may include any of a number of devices allowing the mobile device 204 to receive data from a user 202, such as a keypad, keyboard, touch-screen, touchpad, microphone, mouse, joystick, other pointer device, button, soft key, and/or other input device(s).

The mobile device 204 may further include a power source 315. Generally, the power source 315 is a device that supplies electrical energy to an electrical load. In some embodiment, power source 315 may convert a form of energy such as solar energy, chemical energy, mechanical energy, etc. to electrical energy. Generally, the power source 315 in a mobile device 204 may be a battery, such as a lithium battery, a nickel-metal hydride battery, or the like, that is used for powering various circuits, e.g., the transceiver circuit, and other devices that are used to operate the mobile device 204. Alternatively, the power source 315 may be a power adapter that can connect a power supply from a power outlet to the mobile device 204. In such embodiments, a power adapter may be classified as a power source "in" the mobile device.

The mobile device 204 may also include a memory device 320 operatively coupled to the processing device 310. As used herein, memory may include any computer readable medium configured to store data, code, or other information. The memory device 320 may include volatile memory, such as volatile Random Access Memory (RAM) including a cache area for the temporary storage of data. The memory device 320 may also include non-volatile memory, which can be embedded and/or may be removable. The non-volatile memory may additionally or alternatively include an electrically erasable programmable read-only memory (EEPROM), flash memory or the like.

The memory device 320 may store any of a number of applications or programs which comprise computer-executable instructions/code executed by the processing device 310 to implement the functions of the mobile device 204 described herein. For example, the memory device 320 may include such applications as an object recognition application 325, an AR presentment application 321, a web browser application 322, an SMS application 323, an email application 324, etc.

FIG. 4 further illustrates a mobile device 204 wherein the user 202 has executed an object recognition application 325, an AR presentment application 321, and a real-time video capture device (e.g., camera 370) is utilized to display the surrounding environment 250 on the display 330 of the mobile device 204. In some embodiments, the mobile device 204 is configured to utilize markers 230 to identify objects 220, such as products and/or budget data, and indicate to the user 202 identified objects 220 by displaying a virtual image 400 on the mobile device display 330. As illustrated in FIG. 4, if an object 220 does not have any markers 230 (or at least enough markers 230 to yield object identification), the object 220 will be displayed without an associated virtual image 400.

The object recognition application 325 of the mobile device 204 may use any type of means in order to identify desired objects 220. For instance, the object recognition application 325 may utilize one or more pattern recognition algorithms to analyze objects in the environment 250 and compare with markers 230 in data storage 371 which may be contained within the mobile device 204 (such as within chip 380) or externally on a separate system accessible via the connected network 201, such as but not limited to the financial institution server 208. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 220 within the real-time video stream via the object recognition application 325, the mobile device 204 is configured to superimpose a virtual image 400 on the mobile device display 330 utilizing the AR presentment application 321. The virtual image 400 is generally a tab or link displayed such that the user 202 may "select" the virtual image 400 and retrieve information related to the identified object. The information may include any desired information associated with the selected object and may range from basic information to greatly detailed information. In some embodiments, the virtual image 400 may provide the user 202 with an internet hyperlink to further information on the object 220. The information may include, for example, all types of media, such as text, images, clipart, video clips, movies, or any other type of information desired. In yet other embodiments, the virtual image 400 information related to the identified object may be visualized by the user 210 without "selecting" the virtual image 400.

In embodiments in which the virtual image 400 provides an interactive tab to the user 202 utilizing the AR presentment application 321 of the mobile device 204, the user 202 may select the virtual image 400 by any conventional means for interaction with the mobile device 204. For instance, in some embodiments, the user 202 may utilize an input device 340 such as a keyboard to highlight and select the virtual image 400 in order to retrieve the information. In a particular embodiment, the mobile device display 330 includes a touch screen that the user may employ to select the virtual image 400 utilizing the user's finger, a stylus, or the like.

In some embodiments, the virtual image 400 is not interactive and simply provides information to the user 202 by superimposing the virtual image 400 onto the display 330. For example, in some instances it may be beneficial for the object recognition application 325 and/or the AR presentment application 321 to merely identify an object 220, just identify the object's name/title, give brief information about the object, etc., rather than provide extensive detail that requires interaction with the virtual image 400. The mobile device 204 along with the object recognition application 325 and/or the AR presentment application 321 are capable of being tailored to a user's desired preferences.

Furthermore, the virtual image 400 may be displayed at any size on the mobile device display 330. The virtual image 400 may be small enough that it is positioned on or next to the object 220 being identified such that the object 220 remains discernable behind the virtual image 400. Additionally, the virtual image 400 may be semi-transparent such that the object 220 remains discernable behind the virtual image. In other embodiments, the virtual image 400 may be large enough to completely cover the object 220 portrayed on the display 330. Indeed, in some embodiments, the virtual image 400 may cover a majority or the entirety of the mobile device display 330.

The user 202 may opt to execute the object recognition application 325 and/or the AR presentment application 321 at any desired moment and begin video capture and analysis. However, in some embodiments, the object recognition application 325 and/or the AR presentment application 321 includes an "always on" feature in which the mobile device 204 is continuously capturing video and analyzing the objects 220 within the video stream. In such embodiments, the object recognition application 325 may be configured to alert the user 202 that a particular object 220 has been identified. The user 202 may set any number of user preferences to tailor the AR experience to his needs. For instance, the user 202 may opt to only be alerted if a certain particular object 220 is identified. Additionally, it will be appreciated that the "always on" feature in which video is continuously captured may consume the mobile device power source 315 more quickly. Thus, in some embodiments, the "always on" feature may disengage if a determined event occurs such as low power source 315, low levels of light for an extended period of time (e.g., such as if the mobile device 204 is in a user's pocket obstructing a clear view of the environment 250 from the mobile device 204), if the mobile device 204 remains stationary (thus receiving the same video stream) for an extended period of time, the user sets a certain time of day to disengage, etc. Conversely, if the "always on" feature is disengaged due to the occurrence of such an event, the user 202 may opt for the "always on" feature to re-engage after the duration of the disengaging event (e.g., power source 315 is re-charged, light levels are increased, etc.).

In some embodiments, the user 202 may identify objects 220 that the object recognition application 325 does not identify and add it to the data storage 371 with desired information in order to be identified and/or displayed in the future. For instance, the user 202 may select an unidentified object 220 and enter a name/title and/or any other desired information for the unidentified object 220. In such embodiments, the object recognition application 325 may detect/record certain markers 230 about the object so that the pattern recognition algorithm(s) (or other identification means) may detect the object 220 in the future. Furthermore, in cases where the object information is within the data storage 371, but the object recognition application 325 fails to identify the object 220 (e.g., one or more identifying characteristics or markers 230 of the object has changed since it was added to the data storage 371 or the marker 230 simply was not identified), the user 202 may select the object 220 and associate it with an object 220 already stored in the data storage 371. In such cases, the object recognition application 325 may be capable of updating the markers 230 for the object 220 in order to identify the object in future real-time video streams.

In addition, in some embodiments, the user 202 may opt to edit the information or add to the information provided by the virtual image 400. For instance, the user 202 may opt to include user-specific information about a certain object 220 such that the information may be displayed upon a future identification of the object 220. Conversely, in some embodiments, the user may opt to delete or hide an object 220 from being identified and a virtual image 400 associated therewith being displayed on the mobile device display 330.

Furthermore, in some instances, an object 220 may include one or more markers 230 identified by the object recognition application 325 that leads the object recognition application 325 to associate an object with more than one object in the data storage 371. In such instances, the user 202 may be presented with the multiple candidate identifications and may opt to choose the appropriate identification or input a different identification. The multiple candidates may be presented to the user 202 by any means. For instance, in one embodiment, the candidates are presented to the user 202 as a list wherein the "strongest" candidate is listed first based on reliability of the identification. Upon input by the user 202 identifying the object 220, the object recognition application 325 may "learn" from the input and store additional markers 230 in order to avoid multiple identification candidates for the same object 220 in future identifications.

Additionally, the object recognition application 325 may utilize other metrics for identification than identification algorithms. For instance, the object recognition application 325 may utilize the user's location, time of day, season, weather, speed of location changes (e.g., walking versus traveling), "busyness" (e.g., how many objects are in motion versus stationary in the video stream), as well any number of other conceivable factors in determining the identification of objects 220. Moreover, the user 202 may input preferences or other metrics for which the object recognition application 325 may utilize to narrow results of identified objects 220.

The AR presentment application 321 may then provide virtual objects or indicators associated with the objects in the real-time video stream. The AR presentment application 321, in this way, may provide for superimposing a virtual object and/or indicators associated with objects 230 in the video stream, such that the user 202 may receive more information associated with the object 220 in the real-time video stream.

In some embodiments, the AR presentment application 321 may have the ability to gather and report user interactions with displayed virtual images 400. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include user financial behavior, purchase power/transaction history, and the like.

In some embodiments, the information provided by the real-time video stream may be compared to data provided to the system through an API. In this way, the data may be stored in a separate API and be implemented by request from the mobile device and/or server accesses another application by way of an API.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

FIG. 5 illustrates a process map for populating a user directory using a real-time video stream 500. At block 502 the user 202 approaches products and/or budget data. Once the user 202 approaches the product and/or budget data, the user 202 may point is mobile device at a product and/or budget data located in an environment, at block 504. At block 506 the user 202 may capture images, while pointing his mobile device, of products and/or budget data as part of a real-time video stream. Once the user 202 has captured images, the system may receive the information associated with the image 508. The image may be a single frame of video (e.g., a screenshot) to the entirety of the video. Additionally, rather than video, the user may opt to take a still picture of the environment to be the image received. The image may further comprise multiple single images compiled together. In some embodiments, the system may be provided by the financial institution, such as described above with respect to the financial institution server 208. In some embodiments, the system may be provided by the user 202, such as described above with respect to the mobile device 204. Once the system receives the information associated with the image the system compares the information from the image to identifying data stored in the memory device, as illustrated in block 510. In some embodiments the information associated with the image may be utilized by the object recognition application 325 to determine the object 230 in the image. The identifying data may determine the product and/or budget data in the image, from the information sent to the system. For example, if the user 202 is a car dealership, the data from the image the user 202 took may provide data to the system such that the system may know the exact make, model, price, and history of all of the vehicles in the image. At block 512 the information is analyzed based on the directory comprising the user's budget and wish list. The object is then determined to be implemented into the user's budget and/or wish list. As illustrated in block 513, the information about the product and/or budget data is then provided to the directory.

Once the information is provided to the directory in block 513, in decision block 514, a determination is made as to whether the mobile device 204 is still capturing video stream of an object, product, and/or budget data. If no video stream is being captured then no indicator is presented in block 516 via the AR presentment application 321. If a video stream is still being capture, then in block 518 indicators are continuing to be presented. The indicators are associated with a product and/or budget data that the user 202 may visualize in an environment 250 via the AR presentment application 321. In some embodiments, the user 202 may be provided with a real-time updated wish list and/or budget prior to selecting an indicator. In some embodiments, as illustrated in block 520, a user 202 may receive directory information such as budget and/or wish list data after the user 202 selects the indicator.

Next, as illustrated in block 520, the user 202 may select an indicator associated with the product and/or budget data located in the real-time video stream to obtain information about the product and/or budget data. In this way, the information may be provided to the user's budget and wish list in real-time, such that the user 202 may be able to see his/her budget and wish list with the product and/or budget data associated therein.

A user budget provides a financial plan that forecasts revenues and expenditures, such that a model of financial performance may be obtained if certain strategies, evens, and/or plans are carried out. Budgets may include plans for saving, borrowing, and/or spending. In some embodiments, the budget may provide the user 202 with real-time indication as to how purchasing a product may affect the user's budget, a future budget based on the purchasing of the product, changes in the budget, loans for purchasing the product, connection to a financial analyst, etc.

A user wish list is a list that includes products that the user may wish to purchase or is planning to purchase in the future. These products may then be monitored for price changes, discounts, merchants providing the product, similar products, comments/reviews of the product, promotional offers for the product, accompanying products, and/or the like.

As illustrated in block 522, the user 202 may be able to, upon selecting the indicator, review the product and/or budget data within the user's budget and wish list. As also illustrated in block 522, the user 202 may be able to communicate with a financial provider, and if the image corresponds to a product, the user 202 may be able to purchase the product.

FIG. 6 illustrates a process map for the analyzing the real-time video stream to determine a budget and/or wish list recommendation based on the populated directory 600. As illustrated in block 602 the system may receive product and budget data information for analysis. This information may be provided via real-time video stream, images, photographs, the Internet, etc. Next, the system may determine where in the user's directory to store the information received about the product or budget data, as illustrated in block 604. In some embodiments, the system may incorporate the information received into the user's wish list 606. In other embodiments the system may incorporate the information received into the user's budget 608. In still other embodiments, the system may incorporate the information received about the product and/or budget data into bot the user's wish list 606 and the user's budget 608.

The user's wish list 606 is a list that includes products that the user 202 may wish to purchase or is planning to purchase in the future. In some embodiments, the wish list may be populated manually by the user, using an interface and/or the like. In some embodiments, the wish list may be set up automatically by the system for the user. In yet other embodiments, the wish list may be set up via a combination of user input and system automatic wish list population. The wish list 606 may be provided to the user 202 through an interface, such as that illustrated in FIG. 7. The real-time video image of the product may be incorporated into the user's wish list 606 such that upon selection of the wish list 606, information about the product will be available to the user 202 in real-time. In this way, the system may be able to receive images of the products the user 202 may wish to provide to the user's wish list 606, identify those products and update the user's wish list 606 with those products. The wish list 606 stores a list of products that the user 202 may wish to purchase or is planning to purchase in the further. The system may monitor the products on the wish list to find the best price 610, identify price changes, find merchants selling the products 612, find promotional offers for the products 614, compare similar products 616, comments/reviews of the product, accompanying products, and/or the like. Furthermore, the system allows the user 202 to set up preferences for the wish list 606 as illustrated in block 609. In this way, the user 202 may be able to select what information the system may display with respect to the products on the user's wish list 606, the purchase order of the products, and other selectable preferences.

For example, the user 202 may not wish to see information about products that are similar to the product on the wish list 606, instead the user 202 knows that he/she wants to purchase that particular product. Therefore, the user 202 may set up the wish list 606 to only notify him/her when there is a promotion, change in price, etc. for that particular product. Utilizing the set up 609 capabilities of the wish list 606 the user 202 may be able to completely customize the user's wish list 606 to his/her preferences. Finally, product on the user's wish list 606 may also be incorporated into the user's budget 608, such that the user 202 may be able to receive an indication as to the impact of purchasing a product on the wish list 606 with respect to his/her future financial state.

The user's budget 608 provides a financial plan that forecasts revenues and expenditures, such that a model of financial performance may be obtained if certain strategies, evens, and/or plans are carried out. The user's budget 608 may include plans for saving, borrowing, and/or spending. The user's budget 608 may be a single budget or may be multiple budgets. The budgets 608 may include, but are not limited to macro, category, commercial, micro, groups, sales, production, cash flow, marketing, project expenditure, businesses, and/or any other potential budgeting requirement. The budgets 608 may be used by any user 202, including but not limited to individuals, families, businesses, corporations, merchants, manufacturers, and/or other entities. In some embodiments, the user 202 may input, via an interface, such as that illustrated in FIG. 8, or the like information to set up the user's budget 608. In other embodiments, the system may automatically set up a user's budget 608. In yet other embodiments, a combination of user 202 input and automatic system input may be utilized to set up the user's budget 608.

In some embodiments the user 202 may set up 617 the user's budget 608. The user 202 may input several items into the budget 608, such as, but not limited to answering of financial questions from the system, input of financial plans, input of financial history, bills, statements, expenses, savings, input goals, etc. to set up the user's budget 608 to the user's specific needs. In this way, the user 202 may be able to set up budgets 608 for overall budgeting, micro budgeting, the user's place of business, etc. by imputing preferences and budgeting goals. The system may then automatically run the user's budget based on the user's inputs. Furthermore, the system may provide purchase and other budgeting recommendations based on the user's input.

In some embodiments, the system may aid the user 202 or completely set up 617 the user's budget 608 utilizing several factors, including but not limit to utilizing financial plans, the user's financial history, similarly situated individuals' financial history, crowd sourcing data, financial advisor recommendations, and/or the like to set up the user's budget. Information associated with these factors may be known to the system based on the unique position with respect to financial institution data associated with the user 202.

Financial plans of a user 202 may include financial goals, payment strategies, tax strategies, personal planning, loan repayment (e.g., student loan repayment, car loan repayment, etc.), paying off credit card debt (e.g., paying off one credit card with higher interest rates faster than other debt), mortgage repayment and/or the like. The financial goals of the user 202 may include savings goals, such as saving for a child's college, investments, saving to reach a specific amount, saving to purchase a specific product, retirement savings goals, etc. Personal planning may include vacation planning, job loss planning, emergency planning, and social networking data.

User 202 financial history includes payment strategies of the user 202 may have previously implemented, previous earnings, previous purchasing habits, previously used purchase methods, previous bills, etc. that may be used by the system to determine a budget that may be suitable for the user to implement. Similarly situated individuals' financial history includes the system reviewing and determining budgets for individuals that are in the similar financial, local, age, etc. position as the user 202. In this way, the user 202 receives aggregate data for other individuals that are similarly situated to provide to the user's budget 608.

The user's budget 608 may comprise financing 618 for the user 202, budget adjustment 602, goals 622, strategies 624, and planning 626. These may be provided to the user 202 in real-time, such that the user 202 may realize how making a financial decision may impact financing 618 for the user 202, budget adjustment 602, goals 622, strategies 624, and planning 626 that has previously been set up as the user's budget 608.

Next, as illustrated in block 628, the user 202 upon selecting the indicator associated with the product or budget data in the real-time video stream may be directed to an interface associated with the user's wish list and/or budget. In some embodiments, the user's wish list and/or budget may be displayed as part of the indicator on the real-time video stream. In yet other embodiments, upon selecting the indicator the user 202 may be directed to his/her wish list and/or budget. The wish list 606 may be provided to the user 202 through an interface, such as that illustrated in FIG. 7. The budget 608 may be provided to the user 202 through an interface, such as that illustrated in FIG. 8.

FIG. 7 illustrates a wish list interface 700, in accordance with an embodiment of the invention. Wish list products include favorite products of the user that the user 202 may wish to purchase or will purchase in the future. In some embodiments, wish list products may be provided to the system by the user by a wish list interface 700. The wish list interface 700 may be provided from a financial institution to the mobile device 204 of the user 202. The wish list interface 700 may also be provided from a financial institution to the user 202 through online banking means. The user 202 may access the wish list interface 700 in any means he/she would typically access online banking. In this way, the user 202 may provide wish list products at any time they have access to online banking. Wish list products may also be provided by the user 202 by social networks. In this way, the individual may provide a list of products or business he recommends on his social network page.

The wish list interface 700, in some embodiments requires entering information for security reasons. At this point, the user 202 may enter a user name 706, a password 708, and a reply to a security question 710 in the security section 704 of the wish list interface 700. If the user name 706, password 708, and the reply to a security question 710 are satisfactory, the interface prompts the user 202 to the next step in the process. For example, if the user name 706 is being used by a current user, the new user will be prompted to create a different user name 706. The user 202 may provide products that the user 202 may wish to purchase, will purchase, or is interested in purchasing via the wish list interface 700 in the information about image to add to wish list section 736.

The information about image to add to wish list section 736 of the wish list interface 700 may allow for adding products to the wish list and subsequently viewing products currently on the user's 202 wish list. The user 202 may be provided a visualization of the image in the real-time video stream in section 742. The user 202 may also be provided with information about the product in the image in section 744. This information may include, but is not limited to, the price of the product, the price of the product at different merchants, specifications of the product, promotions, etc. At this point, the user 202 may select the product in the real-time video stream to be incorporated into the user's wish list, as illustrated in section 476. Once the user 202 has selected the product, the user 202 may add the product to his/her current wish list 740, by selecting the add button.

Once the user 202 has selected the add button, the product in the image may appear on the user's current wish list 740. The wish list has a compilation of all the products that have been added to the user's wish list. The products may have been added during a previous session or during the session. If the user 202 wishes, he/she may remove a product from the current wish list 740 if it is no longer a product the user 202 may wish to purchase. In some embodiments, the system may automatically remove the product if the system has received an indication that the user 202 has purchased the product or a similar product. The user 202 may also select products on his/her currently wish list 740 and view images of the products that are on the wish list by selecting the show image of product on wish list section 748.

Along with the current wish list 740 the user 202 may be able to select current information about the products on the wish list, as illustrated in section 712. The information available for the user 202 may include, but is not limited to merchant location 714, price 724, sales 716, promotions 720, alternative products 722, and accompanying products 718. Merchant location 714 provides the user 202 with an indication of all the merchants, online, virtual, physical, and the like, that currently are selling one or more products on the user's wish list. Price 724 includes the price of the products on the user's wish list, including the price for the product at any of the merchants where the product is found, price differences compared to a previous price found at that merchant, and future potential price changes the system may predict may occur. Sales 716 include any merchant sales for the product on the wish list, alternative products, and/or accompanying products. Promotions 720 includes any discounts, offers, coupons, etc. that may be available via the Internet and/or any other merchant. Alternative products 722 include products that are similar to the product on the user's wish list, but instead may be a different model, brand, type, etc. Accompanying products 718 include products that may accompany the product on the wish list. For example, if the user 202 has a bicycle on his/her wish list, then accompanying products may include bike shorts, a helmet, water bottles, a trainer, warranty information, etc. In this way, the user 202 may be able to purchase the product on his/her wish list as well as the accessories that may be needed to go along with the product.

Financing for the purchase of the product may also be available to the user 202 through the wish list interface 700 of FIG. 7. As illustrated in section 728 the user 202 may be able to finance the purchase of the product on his/her wish list. Financing may include providing access to the user's budget in section 728, such that the user 202 may be able to see how the purchase of the product may affect the user's budget in the future. Financing may also include a payment account section 730, such that a user 202 may be able to see which payment account the system or the financial institution, through a financial advisor, may recommend for the purchase of the product. Finally, financing the purchase of a product may include loan procurement 732, such that the user 202 may receive real-time loan procurement for the purchase of the product. Loan procurement 732 may be provided and approved by the financial institution in real-time, such that the user 202 may not have to wait to purchase a product to ensure financing from a financial institution. For example, a user 202 may wish to purchase a vehicle using a loan from a financial institution. If the user 202 selects the indicator associated with the vehicle he wishes to purchase, the financial institution may approve him for a loan at that point. The rates, variables, and conditions for the loan will be provided to the user 202. The user 202 may also provide the data to the car dealer, so that the car dealer may have knowledge of the approved loan. Therefore, expediting the user's purchase of products that may require financing. Once the user 202 has completed using his/her wish list, the user 202 may select the finished button 752 in order to close out of the wish list interface 700.

FIG. 8 illustrates a budget interface 800, in accordance with an embodiment of the invention. The budget interface 800 provides the user 202 with access to his/her real-time budget. In some embodiments, budget data may be provided to the system by the user 202 by the budget interface 800. The budget interface 800 may be provided from a financial institution to the mobile device 204 of the user 202. The budget interface 800 may also be provided from a financial institution to the user 202 through online banking means. The user 202 may access the budget interface 800 in any means he/she would typically access online banking. In this way, the user 202 may provide budget data or view his/her current budget at any time they have access to online banking.

As illustrated in FIG. 8, at section 802 of the budget interface 800 the user 202 may select which of the user's budgets to view. In this way, the system may allow the user 202 to have many different budgets through the system at one time. In the embodiment illustrated in FIG. 8, the user 202 has three budgets, Budget A, Budget B, and Budget C to select from. Once the user 202 selects the budget he/she wishes to utilize, the user 202 may then, in section 804, view or add financial plans. Financial plans of a user 202 may include, but are not limited to financial goals, payment strategies, tax strategies, and/or personal planning.

In this way, the financial plans 804 section may include sub-sections such as the financial goals section 806, the payment strategies 807, and personal plans 808. Financial goals 806 may include savings goals, such as saving for a child's college, making an investment, saving to reach a specific amount, or saving for retirement. In some embodiments, a user 202 may have multiple savings goals, of which some may be more important than others to the user 202 at a particular time. Payment strategies 807 may include loan repayment, such as repaying a student loan, a car loan, a personal bank loan, etc. Payment strategies 807 may also include paying off debt, such as mortgage repayment, credit card debt repayment, or personal debt repayment. Personal plans 808 may include vacation planning, job loss planning, emergency planning, social networking data, and/or tax planning. Vacation planning may include a user 202 saving for airfare, lodging, or other travel expenses. Job loss planning allows the user 202 to direct the payment determination account to allocate financial transaction requests to accounts to maximize finances in case of a situation of unemployment. Emergency planning allows the user 202 to direct the system to allocate transaction requests to accounts to maximize available financial resources to use in case of an emergency situation. Tax planning allows the user 202 to direct the payment determination account to allocate transaction requests to accounts to utilize tax planning strategies set by the user 202.

The user 202 may input financial plans 804 via the budget interface 800, as illustrated in FIG. 8. In other embodiments, the system may automatically provide the user 202 with financial plans 804. In this way, the system may utilize the financial institution server 208 and the other systems on the network 201 to determine information about the user 202, such as, but not limited to his/her prior finances, prior purchases, crowd sourcing, similarly situated individual budgets, wish lists, etc. to set up and/or populate the budget.

Next, in section 810 of the budget interface 800 the user 202 may rank the budget's importance 810. In this way, if the user 202 has multiple budgets, for example, an overall budget, an entertainment budget, a food budget, and/or the like, the user 202 may be able to rank the budgets that are more important. In this way, if a user 202 makes a purchase of a product in one budget, the impact of the purchase may be shifted to a less or more important budget in order for the user's budgets to balance out. Furthermore, the user 202 may be able to rank aspects associated with determining the user's budget, such as financial goals, in section 836 and plans, in section 838. In this way, the user's budget may be implemented with the goals or plans that are most important to the user 202, allowing the budget to be adapted to the user's specific needs.

In some embodiments, the ranking of goals and/or plans provides a selection box to add a numerical value to each of the goals and/or plan, or other ranking or rating indicator. For example, the user 202 that had student loans, a car loan, and a mortgage to repay may want to focus his repayments to the loan having the highest interest rates. Therefore, the user 202 may rank the highest interest rate loan as the most important goal in his financial plan.

In some embodiments, the user 202 may be provided with current budget graphs 812. These graphs may include, but are not limited to charts, graphs, tables, etc. that may allow a user 202 to visualize his/her budget quickly and easily. In the embodiment illustrated in FIG. 8, there are pie graphs indicating the user's current budget 1520 and the user's updated budget 1522. The user's updated budget 1522 incorporates the potential purchase of a product in the real-time video stream. In this way, the user's updated budget 1522 may reflect the user's potential future budget change with respect to if the user 202 purchases a product. The current budget pie chart 1520 shows the percent of funds dedicated to allocated areas including retail store purchases 1518, fuel purchases 1516, grocery purchases 1514, entertainment purchases 1512, and payment of bills 1510. In this way, the user 202 may visualize his/her current purchase habits and current budgeting of expenses in these areas. The updated budget 1522 allows a user 202 to visualize the change and/or deviation from the current budget 1520 that purchasing a product in the real-time video stream. As illustrated, the purchasing of the product may affect the user's current budget 1520 by shifting a larger portion of the budget into the entertainment 1512 area. Once the user 202 has completed utilizing his/her budget interface 800, the user 202 may select the finished button to exit his/her budget.

Referring back to FIG. 6, the system, at any time during or after the user 202 has utilized his/her wish list 606 and/or budget data 608 the user may, in decision block 630 be linked to a financial advisor via the user's mobile device 204. In this way, if the user 202 has a budgeting and/or wish list question the user 202 may be able to communicate at any time with a financial advisor that may provide the user 202 with suggestions on any aspect of the budget and/or wish list. If the user does not wish to be linked to a financial advisor in decision block 630, the user 202 may proceed back to the user's wish list 606 and/or budget 608. If the user 202 decides to be linked to a financial advisor in decision block 630 the user 202 may, through audio communication, text communication, and/or the like be provided the ability to communication with the financial advisor as illustrated in block 632.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Thus, methods, systems, computer programs and the like have been disclosed that provide for using real-time video analysis, such as AR or the like to assist the user of mobile devices with commerce activities. Through the use real-time vision object recognition objects, logos, artwork, products, locations and other features that can be recognized in the real-time video stream can be matched to data associated with such to assist the user with commerce activity. The commerce activity may include, but is not limited to; conducting a transaction, providing information about a product/service, providing rewards based information, providing user-specific offers, or the like. In specific embodiments, the data that matched to the images in the real-time video stream is specific to financial institutions, such as user financial behavior history, user purchase power/transaction history and the like. In this regard, many of the embodiments herein disclosed leverage financial institution data, which is uniquely specific to financial institution, in providing information to mobile devices users in connection with real-time video stream analysis.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |
| 61/478,402 | Apr. 22, 2011 | Real-Time Video Image Analysis for an Appropriate Payment Account |

What is claimed is:

1. A method for populating a user directory, the method comprising:

receiving financial information for a user, wherein the financial information provides an indication of financial history of the user;

analyzing, via a processing device, a real-time video stream representing a surrounding environment captured on a mobile device;

identifying one or more products within the real-time video stream;

determining a location in the user directory to populate with the one or more products identified within the real-time video stream, wherein the user directory comprises a user budget and a user wish list;

determining information about the one or more products within the real-time video stream, wherein the information about the one or more products comprises a price associated with the one or more products within the real-time video stream;

presenting, via superimposing over the real-time video stream on the mobile device, a selectable indicator associated with the one or more products within the real-time video stream, wherein the selectable indicator provides real-time impact on the user budget and the user wish list for the one or more products identified within the real-time video stream if the one or more products in the real-time video stream were purchased by the user associated with the user mobile device displaying the real-time video stream, wherein presenting the selectable indicator comprises superimposing the selectable indicator with the real-time impact of the one or more products on the user budget and the user wish list over the real-time video stream of the one or more products; and providing, via selection of the selectable indicator, a communicable link between the user and a financial advisor, via the mobile device, and transmitting the real-time video stream with the selectable indicator superimposed over the real-time video stream to the financial advisor via the communicable link, such that the financial advisor can advise the user based on the real-time impact that purchasing one or more products would have on the user budget and the user wish list.

2. The method of claim 1 further comprises providing the user with real-time loan procurement for purchasing the one or more products, wherein the real-time loan procurement is based at least in part on the received financial information for the user.

3. The method of claim 1, wherein identifying one or more products comprises implementing, via a computer device processor, object recognition processing to identify one or more images within the real-time video stream that correspond to one or more products.

4. The method of claim 1, wherein identifying one or more products further comprises capturing a tag located on one of the one or more products and reading the tag to identify the one of the one or more products.

5. The method of claim 1, further comprising developing a budget strategy, wherein the budget strategy is based at least in part on the received financial information for the user, wherein the received financial information comprises at least one of user transaction history, user income, user financial plans, or user personal plans.

6. A system for populating a user directory, the system comprising:

a memory device with computer-readable program code stored thereon;

a communication device;

a processing device operatively coupled to the memory device and the communication device, wherein the processing device is configured to execute the computer-readable program code to:

receive financial information for a user, wherein the financial information provides an indication of financial history of the user;

analyze a real-time video stream representing a surrounding environment captured on a mobile device;

identify one or more products within the real-time video stream;

determine a location in the user directory to populate with the one or more products identified within the real-time video stream, wherein the user directory comprises a user budget and a user wish list;

determine information about the one or more products within the real-time video stream, wherein the information about the one or more products comprises a price associated with the one or more products within the real-time video stream;

present, via superimposing over the real-time video stream on the mobile device, a selectable indicator associated with the one or more products within the real-time video stream, wherein the selectable indicator provides real-time impact on the user budget and the user wish list for the one or more products identified within the real-time video stream if the one or more products in the real-time video stream were purchased by the user associated with the user mobile device displaying the real-time video stream, wherein presenting the selectable indicator comprises superimposing the selectable indicator with the real-time impact of the one or more products on the user budget and the user wish list over the real-time video stream of the one or more products; and provide, via selection of the selectable indicator, a communicable link between the user and a financial advisor, via the mobile device, and transmitting the real-time video stream with the selectable indicator superimposed over the real-time video stream to the financial advisor via the communicable link, such that the financial advisor can advise the user based on the real-time impact that purchasing one or more products would have on the user budget and the user wish list.

7. The system of claim 6 further comprises providing the user with real-time loan procurement for purchasing the one or more products, wherein the real-time loan procurement is based at least in part on the received financial information for the user.

8. The system of claim 6, wherein identifying one or more products comprises implementing, via a computer device processor, object recognition processing to identify one or more images within the real-time video stream that correspond to one or more products.

9. The system of claim 6, wherein identifying one or more products further comprises capturing a tag located on one of the one or more products and reading the tag to identify the one of the one or more products.

10. The system of claim 6, further comprising developing a budget strategy, wherein the budget strategy is based at least in part on the received financial information for the user, wherein the received financial information comprises at least one of user transaction history, user income, user financial plans, or user personal plans.

11. A computer program product for populating a user directory, the computer program product comprising at least one non-transitory computer-readable medium having computer-readable program code portions embodied therein, the computer-readable program code portions comprising:

an executable portion configured for receiving financial information for a user, wherein the financial information provides an indication of financial history of the user;

an executable portion configured for analyzing a real-time video stream representing a surrounding environment captured on a mobile device;

an executable portion configured for identifying one or more products within the real-time video stream;

an executable portion configured for determining a location in the user directory to populate with the one or more products identified within the real-time video stream, wherein the user directory comprises a user budget and a user wish list;

an executable portion configured for determining information about the one or more products within the real-time video stream, wherein the information about the one or more products comprises a price associated with the one or more products within the real-time video stream;

an executable portion configured for presenting, via superimposing over the real-time video stream on the mobile device, a selectable indicator associated with the one or more products within the real-time video stream, wherein the selectable indicator provides real-time impact on the user budget and the user wish list for the one or more products identified within the real-time video stream if the one or more products in the real-time video stream were purchased by the user associated with the user mobile device displaying the real-time video stream, wherein presenting the selectable indicator comprises superimposing the selectable indicator with the real-time impact of the one or more products on the user budget and the user wish list over the real-time video stream of the one or more products; and an executable portion configured for providing, via selection of the selectable indicator, a communicable link between the user and a financial advisor, via the mobile device, and transmitting the real-time video stream with the selectable indicator superimposed over the real-time video stream to the financial advisor via the communicable link, such that the financial advisor can advise the user based on the real-time impact that purchasing one or more products would have on the user budget and the user wish list.

12. The computer program product of claim 11 further comprises an executable portion configured for providing the user with real-time loan procurement for purchasing the one or more products, wherein the real-time loan procurement is based at least in part on the received financial information for the user.

13. The computer program product of claim 11, wherein identifying one or more products comprises implementing, via a computer device processor, object recognition processing to identify one or more images within the real-time video stream that correspond to one or more products.

14. The computer program product of claim 11, wherein identifying one or more products further comprises capturing a tag located on one of the one or more products and reading the tag to identify the one of the one or more products.

15. The computer program product of claim 11, further comprising an executable portion configured for developing a budget strategy, wherein the budget strategy is based at least in part on the received financial information for the user, wherein the received financial information comprises at least one of user transaction history, user income, user financial plans, or user personal plans.

* * * * *